(12) United States Patent
Hayashi et al.

(10) Patent No.: US 10,994,248 B2
(45) Date of Patent: May 4, 2021

(54) HOLLOW FIBER MEMBRANE MODULE AND MANUFACTURING METHOD THEREOF

(71) Applicant: TORAY INDUSTRIES, INC., Tokyo (JP)

(72) Inventors: Akihiro Hayashi, Otsu (JP); Yoshiyuki Ueno, Otsu (JP)

(73) Assignee: TORAY INDUSTRIES, Tokyo (JP)

( * ) Notice: Subject to any disclaimer, the term of this patent is extended or adjusted under 35 U.S.C. 154(b) by 397 days.

(21) Appl. No.: 15/308,530

(22) PCT Filed: May 7, 2015

(86) PCT No.: PCT/JP2015/063216
§ 371 (c)(1),
(2) Date: Nov. 2, 2016

(87) PCT Pub. No.: WO2015/170708
PCT Pub. Date: Nov. 12, 2015

(65) Prior Publication Data
US 2017/0072371 A1    Mar. 16, 2017

(30) Foreign Application Priority Data

May 8, 2014  (JP) .............................. JP2014-096589
Aug. 27, 2014  (JP) .............................. JP2014-172296

(51) Int. Cl.
*B01D 71/68*   (2006.01)
*B01D 69/02*   (2006.01)
(Continued)

(52) U.S. Cl.
CPC ............. *B01D 71/68* (2013.01); *B01D 63/02* (2013.01); *B01D 63/021* (2013.01); *B01D 65/02* (2013.01);
(Continued)

(58) Field of Classification Search
None
See application file for complete search history.

(56) References Cited

U.S. PATENT DOCUMENTS 4,794,002 A * 12/1988 Henis ................. B01D 67/0088
424/484
5,009,824 A    4/1991 Walch
(Continued)

FOREIGN PATENT DOCUMENTS

CA    2840043 A1 * 12/2012 ............. A61L 31/06
JP    0218695       4/1990
(Continued)

OTHER PUBLICATIONS

Gaaz et al., Properties and Applications of Polyvinyl Alcohol, Halloysite Nanotubes and Their Nanocomposites, 20 Molecules 22833, 22834 (2015). (Year: 2015).*

(Continued)

*Primary Examiner* — Krishnan S Menon
*Assistant Examiner* — Brad Gordon
(74) *Attorney, Agent, or Firm* — RatnerPrestia

(57) ABSTRACT

Disclosed is a hollow fiber membrane module including a case and a hollow fiber membrane built in the case, wherein the hollow fiber membrane contains a polysulfone-based polymer and a hydrophilic polymer, and satisfies the following (A) and (B), and an amount of an eluted substance contained in a liquid obtained by circulating ultrapure water heated at 37° C. through a passage of an inner surface side of the hollow fiber membrane for 4 hours at 200 mL/min is 1.0 mg/m$^2$ or less: (A) an insoluble component accounts for less than 3% by mass of the total mass of the hollow fiber membrane when the hollow fiber membrane is dissolved in N,N-dimethylacetamide; and (B) a flexible layer exists on a surface of a functional layer in a wet state and the flexible layer has a thickness of 7 nm or more. The present invention (Continued)

provides a hollow fiber membrane module including a hollow fiber membrane containing a polysulfone-based polymer and a hydrophilic polymer built therein, which elutes little eluted substance and exhibits high biocompatibility, while change in performance due to crosslinking of the hydrophilic polymer is suppressed.

11 Claims, 2 Drawing Sheets

(51) Int. Cl.
    *B01D 69/08*      (2006.01)
    *B01D 71/38*      (2006.01)
    *B01D 63/02*      (2006.01)
    *B01D 71/52*      (2006.01)
    *B01D 65/02*      (2006.01)
    *B01D 71/40*      (2006.01)
    *B01D 71/44*      (2006.01)

(52) U.S. Cl.
    CPC ............ *B01D 69/02* (2013.01); *B01D 69/08* (2013.01); *B01D 71/38* (2013.01); *B01D 71/40* (2013.01); *B01D 71/44* (2013.01); *B01D 71/52* (2013.01); *B01D 2325/36* (2013.01)

(56) References Cited

U.S. PATENT DOCUMENTS

| | | | |
|---|---|---|---|
| 7,837,042 B2 | 11/2010 | Yokota | |
| 2007/0020325 A1* | 1/2007 | Kuribayashi | ........ A61K 9/0014 424/448 |
| 2008/0044463 A1 | 2/2008 | Yokota | |
| 2008/0044643 A1* | 2/2008 | Yokota | ................. B01D 63/021 428/308.4 |
| 2011/0017654 A1* | 1/2011 | Ueno | ..................... B01D 63/02 210/321.6 |
| 2012/0271010 A1* | 10/2012 | Sakaguchi | .......... A61L 33/0011 525/474 |
| 2013/0306544 A1* | 11/2013 | Ueno | ..................... B01D 63/02 210/321.79 |
| 2015/0343394 A1 | 12/2015 | Hayashi et al. | |

FOREIGN PATENT DOCUMENTS

| | | | | |
|---|---|---|---|---|
| JP | 053331 | | 1/1993 | |
| JP | 2000288085 | | 10/2000 | |
| JP | 2001205057 | | 7/2001 | |
| JP | 2003245526 | | 9/2003 | |
| JP | 2006198611 A | * | 8/2006 | |
| JP | 2009262147 A | | 11/2009 | |
| JP | 2011072987 A | | 4/2011 | |
| JP | 2011072987 A | * | 4/2011 | |
| JP | 2011092928 | | 5/2011 | |
| JP | 2011173115 | | 9/2011 | |
| JP | 4846587 | | 12/2011 | |
| WO | 2006016573 | | 2/2006 | |
| WO | WO-2012091028 A1 | * | 7/2012 | ............. B01D 63/02 |
| WO | 2014129373 A1 | | 8/2014 | |

OTHER PUBLICATIONS

International Search Report and Written Opinion for International Application PCT/JP2015/063216, dated Aug. 11, 2015, 6 pages.
Extended European Search Report for European Application No. 15789788.5, dated Dec. 4, 2017, 7 pages.

* cited by examiner

HOLLOW FIBER MEMBRANE MODULE AND MANUFACTURING METHOD THEREOF

CROSS REFERENCE TO RELATED APPLICATIONS

This is the U.S. National Phase application of PCT International Application No. PCT/JP2015/063216, filed May 7, 2015, and claims priority to Japanese Patent Application No. 2014-096589, filed May 8, 2014, and Japanese Patent Application No. 2014-172296, filed Aug. 27, 2014, the disclosures of each of these applications being incorporated herein by reference in their entireties for all purposes.

FIELD OF THE INVENTION

The present invention relates to a hollow fiber membrane module, and a method for manufacturing a hollow fiber membrane module.

BACKGROUND OF THE INVENTION

Examples of the material of the hollow fiber membrane include a cellulose-based polymer, polyacrylonitrile, polymethyl methacrylate, a polysulfone-based polymer, and the like. Of these, the polysulfone-based polymer is used particularly suitably in a water treatment membrane for a water purifier, or a medical separation membrane of an artificial kidney to be used in a dialysis treatment, because of having high permeability and excellent chemical resistance and strength. Regarding the dialysis treatment, hemodiafiltration (HDF) and intermittent infusion hemodiafiltration (I-HDF) have been developed, in addition to conventional hemodialysis (HD), so as to improve dialysis efficiency and to positively remove a low molecular weight protein. Therefore, the polysulfone-based polymer having high permeability has widely been used as a material that satisfies such dialysis technique.

Examples of the hollow fiber membrane module include a wet-type one in which a container including a hollow fiber membrane bundle built therein is filled with a liquid and a hollow fiber membrane is completely filled with a liquid; a semi-dry-type one in which only a hollow fiber membrane is wetted, although a container is not filled with a liquid; and a dry-type one in which a hollow fiber membrane scarcely contains water. Of these, the dry-type one is suitably used since it has advantages such as light weight and little possibility of deterioration of performance due to freezing even in cold districts, because of containing no water.

Meanwhile, the polysulfone-based polymer is a hydrophobic polymer and a hollow fiber membrane made of the polysulfone-based polymer exhibits strong hydrophobicity on a surface thereof, so that, when the hollow fiber membrane is in contact with blood, there is a fear that activation of blood may occur, leading to proceeding of blood coagulation. Therefore, hydrophilicity of the surface of the membrane has been widely improved by adding a hydrophilic polymer to the polysulfone-based polymer. The method of adding the hydrophilic polymer is generally a method in which a hydrophilic polymer is added to a membrane forming stock solution of a hollow fiber membrane (Patent Literature 1), or a method in which the thus formed hollow fiber membrane is immersed in a solution containing the hydrophilic polymer to thereby impart the hydrophilic polymer to the surface of the hollow fiber membrane surface. Too large hydrophilic polymer added may cause a problem such as elution of the hydrophilic polymer. There is disclosed a method in which the hydrophilic polymer is immobilized by crosslinking due to a heat treatment or a radiation treatment (Patent Literatures 2 and 3). There is also disclosed that it is possible to obtain a hollow fiber membrane, in which an amount of an insolubilized component of the membrane is 10% by weight or less when the hollow fiber membrane is dissolved in a common solvent of a hydrophobic polymer and a hydrophilic polymer, although the water content of the hollow fiber membrane is 10% by weight or less after irradiation with gamma-ray, by irradiating with γ-ray in a dry state to thereby partially cluster a polymer substance constituting the membrane (Patent Literature 4).

It is indispensable that the hollow fiber membrane module to be used as medical equipment is sterilized. The sterilization method include techniques such as ethylene oxide gas sterilization, steam sterilization, and the like. In recent years, a method of sterilization by radiation has widely been employed as a simple sterilization method in which high sterilization effect is obtained even in a packaged state. However, when sterilization is performed by radiation, there may arise deterioration of performance due to degradation of the hollow fiber membrane, or elution of components constituting the hollow fiber membrane, depending on a state of the atmosphere around the hollow fiber during irradiation with radiation. In Patent Literature 5, reduction in eluted substance is achieved by irradiating with radiation in a state where the oxygen concentration is adjusted to 0.1% or more and 3.6% or less, and the water content of the hollow fiber membrane is adjusted to less than a range of 4 to 300%.

In Patent Literature 6, reduction in eluted substance is achieved by irradiating with radiation in a state where the water content is 3% or less, and the relative humidity of the atmosphere around the hollow fiber membrane is 40% or less.

Patent Literature 7 discloses a method of irradiating with radiation in a state where the oxygen concentration is adjusted to 0.001% or more and 0.1% or less and the water content of the hollow fiber membrane to the tare weight is adjusted in a range of 0.2 to 7% by weight or less, under an atmosphere in a packaging bag where the relative humidity at 25° C. is more than 40% Rh.

PATENT LITERATURE

[Patent Literature 1]
 Japanese Examined Patent Publication (Kokoku) No. 2-18695
[Patent Literature 2]
 Japanese Examined Patent Publication (Kokoku) No. 5-3331
[Patent Literature 3]
 Japanese Unexamined Patent Publication (Kokai) No. 2011-92928
[Patent Literature 4]
 Japanese Unexamined Patent Publication (Kokai) No. 2001-205057
[Patent Literature 5]
 Japanese Unexamined Patent Publication (Kokai) No. 2003-245526
[Patent Literature 6]
 Japanese Unexamined Patent Publication (Kokai) No. 2000-288085
[Patent Literature 7]
 Japanese Patent No. 4,846,587

SUMMARY OF THE INVENTION

In the method mentioned in Patent Literature 1, since a hydrophilic polymer is added to a membrane forming stock solution, it is preferred that a hydrophilic polymer can be added to the entire membrane. However, when the entire membrane is hydrolyzed, the amount of the hydrophilic polymer to be added increases, so that there is a fear that the hydrophilic polymer is eluted.

In the methods mentioned in Patent Literatures 2 and 3, a hydrophilic polymer is chemically immobilized to a membrane material and insolubilized, thus enabling suppression of elution of the hydrophilic polymer. However, in these methods, there is a fear that the hydrophilic polymer existing on a surface in contact with a process liquid undergo crosslinking, leading to deterioration of mobility of the hydrophilic polymer, and change in pore diameter of the membrane occurs due to crosslinking, leading to deterioration of performance. Furthermore, when crosslinking is performed by radiation, it is important to irradiate with radiation in the presence of water, so that these methods are unsuited for the manufacture of a dry-type hollow fiber membrane module.

Patent Literature 4 discloses a method in which an eluted substance is reduced by irradiating with γ-ray in a dry state. However, in this method, there is a fear that it becomes difficult to form a cluster due to an influence of a molecular weight of the hydrophilic polymer to be added to the membrane forming stock solution, leading to increase in eluted substance. There is no mention of modification of a surface in contact with a process liquid.

In the method mentioned in Patent Literature 5, it is mentioned that biocompatibility deteriorates in a state where the oxygen concentration is extremely low. As a result of the present inventors' study, it has been found that the eluted substance tends to increase by further decreasing the water content, and thus requiring reduction in eluted substance in higher level.

In the method mentioned in Patent Literature 6, there is no mention of the oxygen concentration during irradiation with radiation. Like the method of Patent Literature 1, there is a fear such as degradation of the hollow fiber membrane material due to generation of an oxygen radical or increase in eluted substance.

In the method mentioned in Patent Literature 7, use of an oxygen scavenger capable of discharging moisture is required so as to achieve a state where the relative humidity is more than 40% Rh. Therefore, there was restriction of need to use a packaging container which exhibits low oxygen permeability and also low steam permeability. There is no mention of solution of a problem such as deterioration of biocompatibility in the case of low oxygen concentration.

As a result of study on the present invention, it has been found that the above-mentioned problem of elution cannot be solved only by simply reducing the oxygen concentration when irradiating the hollow fiber membrane with radiation if the water content is low during irradiation with radiation.

There has never been existing a dry-type hollow fiber membrane module, a hydrophilic polymer of which does not undergo structural change due to crosslinking, and which elutes little eluted substance, and also exhibits excellent biocompatibility An object of the present invention is to provide a hollow fiber membrane module including a hollow fiber membrane built therein, which elutes little eluted substance from a hollow fiber membrane, and also exhibits high biocompatibility.

The present invention is directed to a hollow fiber membrane module including a case and a hollow fiber membrane built in the case, wherein the hollow fiber membrane according to an aspect of the invention contains a polysulfone-based polymer and a hydrophilic polymer, and satisfies the following (A) and (B), and an amount of an eluted substance contained in a liquid obtained by circulating ultrapure water heated at 37° C. through a passage of an inner surface side of the hollow fiber membrane for 4 hours at 200 mL/min is 1.0 mg/m$^2$ or less:

(A) an insoluble component accounts for less than 3% by mass of the total mass of the hollow fiber membrane when the hollow fiber membrane is dissolved in N,N-dimethylacetamide; and (B) a flexible layer exists on a surface of a functional layer in a wet state and the flexible layer has a thickness of 7 nm or more.

The present invention is also directed to a method for manufacturing a hollow fiber membrane module, which includes according to an aspect of the invention the steps of:

mixing a base material composed of a hydrophobic polymer with a hydrophilic polymer including no hydrophobic unit to produce a hollow fiber membrane;

washing the hollow fiber membrane with a washing liquid containing 0.002% by mass or more and 0.05% by mass or less of a polymer including a hydrophilic unit and a hydrophobic unit, and also having an ester group; and building the hollow fiber membrane in a case, and irradiating the hollow fiber membrane under the conditions that the concentration of oxygen in the atmosphere around the hollow fiber membrane is in a range of 0 to 1%, and the water content relative to the mass of the hollow fiber membrane is in a range of 0 to 25% by mass.

According to a hollow fiber membrane module of the present invention and a manufacturing method thereof, it is possible to provide a hollow fiber membrane module which elutes little eluted substance and exhibits biocompatibility.

DESCRIPTION OF EMBODIMENTS

Figure 1:
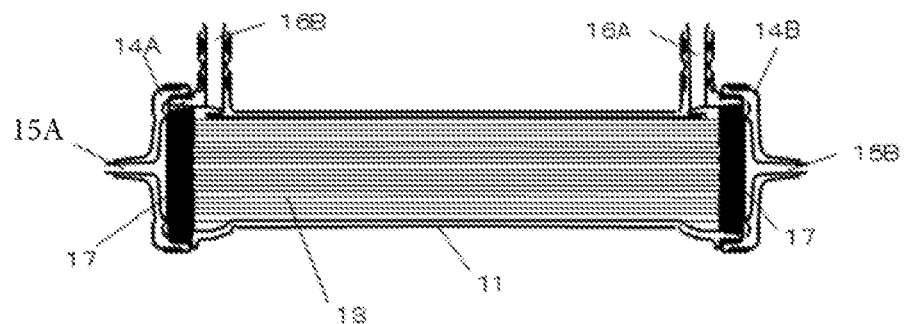
FIG. 1 is a hollow fiber membrane module according to an embodiment of the present invention.

The hollow fiber membrane module of the present invention enables separation into an objective substance to be recovered and a waste from a mixed solution. FIG. 1 is a schematic diagram showing one aspect of a hollow fiber membrane module of the present invention. The hollow fiber membrane module preferably includes a case 11 and a hollow fiber membrane 13, the hollow fiber membrane 13 being built in the case 11. Specifically, a bundle of the hollow fiber membranes 13 cut into a required length is preferably housed in a cylindrical case 11. Both ends of the hollow fiber membrane are preferably fixed to both ends of the cylindrical case 11 by a potting material 17, or the like. At this time, both ends of the hollow fiber membrane are preferably opened.

The hollow fiber membrane module preferably includes headers 14A and 14B at both ends of the case 11. The header 14A preferably includes an inlet 15A of the liquid to be treated. The header 14B preferably includes an outlet 15B of the liquid to be treated. As illustrated in FIG. 1, the hollow fiber membrane module preferably includes nozzles 16A and 16B at the side of the case in the vicinity of both ends of the case.

Usually, a liquid to be treated is introduced through the inlet 15A of the liquid to be treated, passed through the inside of the hollow fiber membrane, and then discharged through the outlet 15B of the liquid to be treated. Meanwhile, a process liquid is usually introduced through the nozzle 16A (the inlet of the process liquid), passed through the outside of the hollow fiber membrane, and then discharged through the nozzle 16B (the outlet of the process liquid). In other words, a flow direction of the liquid to be treated and a flow direction of the process liquid are usually opposed to each other.

When the hollow fiber membrane module of the present invention is used for artificial kidney application (blood purification application), blood serving as a liquid to be treated is usually introduced through the inlet 15A of the liquid to be treated and artificially dialyzed by passing through the inside of the hollow fiber membrane, and then blood after purification as an objective substance to be recovered is discharged through the outlet 15B of the liquid to be treated. In other words, a passage from the inlet 15A of the liquid to be treated to the outlet 15B of the liquid to be treated through the inside of the hollow fiber membrane becomes a passage (blood side passage) of the liquid to be treated. Hereinafter, this passage is sometimes referred to simply as a "blood side passage".

Meanwhile, a dialyzate solution used as a process liquid is introduced through a nozzle 16A (the inlet of the process liquid) and the liquid to be treated (blood) is purified (dialyzed) by passing through the outside of the hollow fiber membrane, and then the dialyzate solution containing a toxic component (waste) in blood is discharged through the nozzle 16B (the outlet of the process liquid). In other words, a passage from the nozzle 16A to the nozzle 16B through the outside of the hollow fiber membrane becomes a passage (dialyzate solution passage) of the process liquid. Hereinafter, this passage is sometimes referred to simply as a "dialyzate solution passage".

The hollow fiber membrane built in the module is made of a hydrophobic polymer, as a base material, mixed with a hydrophilic polymer having no hydrophobic group (hydrophobic unit). Here, the "base material" refers to a component with the highest content of components constituting the hollow fiber membrane. Specific hydrophobic polymer include a polysulfone-based polymer, polystyrene, polyurethane, polyethylene, polypropylene, polyacrylonitrile, and the like. Of these, a polysulfone-based polymer is suitably used since it is easy to form a hollow fiber membrane. The hollow fiber membrane preferably includes a polysulfone-based polymer and a hydrophilic polymer.

The polysulfone-based polymer in embodiments of the present invention is a polymer having an aromatic ring, a sulfonyl group, and an ether group in the main chain, and examples thereof include polysulfone, polyether sulfone, polyallylether sulfone, and the like. For example, polysulfone-based polymers represented by the below-mentioned chemical formulas (1) and (2) are suitably used. The polysulfone-based polymer is not limited thereto in the present invention. In the formulas, n is preferably in a range of 50 to 80.

[Chemical Formula 1]

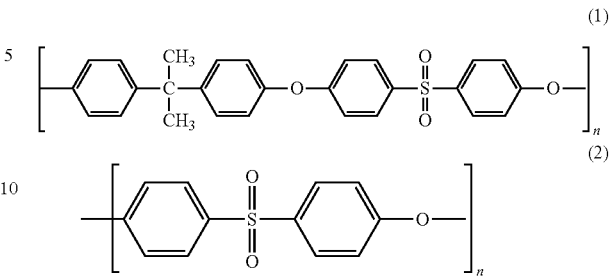

Specific examples of the polysulfone include polysulfones such as Udel (registered trademark) polysulfone P-1700, P-3500 (manufactured by Solvay S.A.), Ultrason (registered trademark) S3010, S6010 (manufactured by BASF Corporation), VICTREX (registered trademark) (manufactured by Sumitomo Chemical Company, Limited), Radel (registered trademark) A (manufactured by Solvay S.A.), and Ultrason (registered trademark) E (manufactured by BASF Corporation). The polysulfone is preferably a polymer composed only of repeating units represented by the formulas (1) and/or (2), but may be those copolymerized with other monomers or modified as long as the effects of the present invention are not impaired. The copolymerization ratio of the other copolymerized monomer is preferably 10% by mass or less, although there is no particular limitation.

The hydrophilic polymer in the present invention refers to a polymer which includes a hydrophilic unit, and is also soluble in water or ethanol. The hydrophilic polymer preferably includes no hydrophobic unit. Here, "soluble" means the fact that 0.1 g or more of the polymer is dissolved in 100 g of water or ethanol at 20° C. Examples of the hydrophilic polymer include polyvinylpyrrolidone, polyalkylene glycol, polyvinyl alcohol, polyethyleneimine, polyacrylic acid, and the like. From the viewpoint of compatibility with the polysulfone-based polymer, polyvinylpyrrolidone is suitably used.

It has hitherto been considered to be important that the hydrophilic polymer has a gel structure and is crosslinked with a polysulfone-based polymer so as to prevent elution of the hydrophilic polymer from the hollow fiber membrane. However, it is considered that biocompatibility deteriorates when mobility of the hydrophilic polymer on a surface in contact with a process liquid deteriorates. It is considered that, when the hydrophilic polymer has a gel structure, performance of the membrane deteriorates due to permeation resistance caused by a gel.

Thus, the inventors have intensively studied and found a method of obtaining a hollow fiber membrane which elutes little eluted substance and exhibits high biocompatibility, even if the hydrophilic polymer has a small amount of a gel structure or scarcely has a gel structure.

The inventors have also found that anti-fouling capability of a protein or an organic substance by suppressing crosslinking of the hydrophilic polymer existing in the surface of the membrane. Although the detailed mechanism is not yet clarified, it is considered that a crosslinked state of the hydrophilic polymer of the surface of the membrane is allowed to turn into a minimal state where no elution occurs, whereby mobility of a polymer in the surface of the membrane is improved as compared with the crosslinked state, thus suppressing adhesion of the protein. In this way, high fouling inhibitory effect of the surface of the membrane leads to suppression of deterioration of module performance during use, which is extremely useful. Although the fouling inhibitory effect will be mentioned below, it is possible to get to know by measuring time-dependent change in albumin sieving coefficient of album contained in blood. The retention ratio of the albumin sieving coefficient may be 50% or more, preferably 60% or more, and more preferably 70% or more.

In the present invention, it is possible to know a cross-linked state of the hydrophilic polymer by selecting N,N-dimethylacetamide (DMAc) as a good solvent and measuring an amount of an insoluble component when a hollow fiber membrane is dissolved in the solvent for the following reason. DMAc can dissolve various substances and the uncrosslinked polysulfone-based polymer and hydrophilic polymer are dissolved in DMAc, however, the hydrophilic polymer having a gel structure and the hydrophilic polymer cross linked with the polysulfone-based polymer also become insoluble in DMAc. Specifically, it is possible to obtain an insoluble component by dissolving the hollow fiber membrane in DMAc, followed by centrifugation to remove the supernatant. Details of the measurement method are as mentioned below in Examples. Too large insoluble component may lead to deterioration of performance and biocompatibility of the membrane. Therefore, the content of the insoluble component in the hollow fiber membrane is preferably less than 3% by mass, more preferably 2% by mass or less, and still more preferably 1% by mass or less.

If a large amount of the hydrophilic polymer is eluted from the hollow fiber membrane module, the eluted polymer is mixed into blood when using for dialysis, so that side effects and complication may occur. Therefore, the amount of the hydrophilic polymer eluted from the hollow fiber membrane module as measured by the following method (hereinafter referred to as the amount of the eluted substance) is preferably 1.0 mg/m$^2$ or less, more preferably 0.75 mg/m$^2$, still more preferably 0.5 mg/m$^2$ or less, and most preferably 0 mg/m$^2$. However, it is sometimes difficult to control the amount of the eluted substance to less than 0.1 mg/m$^2$ and, in that case, the amount of the eluted substance becomes 0.1 mg/m$^2$ or more.

In the present invention, the amount of the eluted substance of the hollow fiber membrane module means the amount of the eluted substance contained in water circulated inside the hollow fiber membrane module for 4 hours. Here, water circulated for 4 hours was obtained in the following manner. Ultrapure water heated to 37° C. was allowed to pass through a passage of the inner surface side of the fiber membrane at a rate of 100 mL/min for 7 minutes, and allowed to similarly pass through a passage of the outer surface side of the fiber membrane at a rate of 500 mL/min for 5 minutes, and again allowed to pass through a passage of the inner surface side of the hollow fiber membrane at a rate of 100 mL/min for 3 minutes, thereby washing the hollow fiber membrane. Subsequently, 4 L of ultrapure water heated to 37° C. was allowed to pass through a passage of the inner surface side of the hollow fiber membrane at a rate of 200 mL/min for 4 hours while circulating and, after circulation for 4 hours, water was collected. Using a measurement sample obtained by concentrating this water circulated for 4 hours 100 times, an eluted substance eluted in water can be measured by gel filtration chromatography. Details of the measurement method are as mentioned below in Examples. The value, which was obtained by dividing the amount (mg) of the hydrophilic polymer in 4 L of the thus obtained water after circulation for 4 hours by the total value of an inner surface area (m$^2$) of the hollow fiber membrane filled into the measured hollow fiber membrane module, was determined to be the amount of the eluted substance (mg/m$^2$) in the present invention. A value, which is obtained by rounding off the second decimal position of the resulting calculated value, is used.

Amount of eluted substance (mg/m$^2$)=amount (mg) of hydrophilic polymer in 4 L/total value of inner surface area of hollow fiber membrane (m$^2$)

The total value of the inner surface area of the hollow fiber membrane is determined by the following equation:

Total value of inner surface area of hollow fiber membrane (m$^2$)=π×inner diameter of hollow fiber membrane (m)×effective length (m)×number of fibers (fibers)

Here, the effective length represents the portion in which a potting material is not adhered in the hollow fiber membrane filled into the hollow fiber membrane module.

It is possible to use, as another index of the amount of the eluted substance of an organic substance from the hollow fiber membrane, the consumption amount of potassium permanganate of an initial washing liquid of the hollow fiber membrane module. The initial washing liquid as used herein means water obtained by sampling from 25 mL of a first washing liquid which flows out after filling the hollow fiber membrane module with water when ultrapure water was allowed to flow into the inside of the hollow fiber membrane at a flow rate of 100 mL/min. In the measurement of an eluted substance contained in this initial washing liquid, 20 mL of an aqueous potassium permanganate solution (2.0×10$^{-3}$ mol/L) and 1 mL of 10% by volume of sulfuric acid, and a boiling stone were added to 10 mL of an initial washing liquid, followed by boiling for 3 minutes. Thereafter, the mixture is cooled to room temperature. After adding 1 mL of an aqueous 10% by mass potassium iodide solution, the mixture was well stirred at room temperature and allowed to stand for 10 minutes, followed by titration with an aqueous sodium thiosulfate solution (1.0×10$^{-2}$ mol/L). At the time when color of the solution turns pale yellow, 0.5 mL of an aqueous 1% by mass starch solution was added, followed by well stirring at room temperature. Thereafter, titration with an aqueous sodium thiosulfate solution is performed until color of the solution turns transparent. A difference between the amount of the aqueous sodium thiosulfate solution (1.0×10$^{-2}$ mol/L) required for titration of ultrapure water which was not allowed to pass through the hollow fiber membrane module, and the amount of the aqueous sodium thiosulfate solution (1.0×10$^{-2}$ mol/L) required for titration of the initial washing liquid was defined as an index of the amount of the eluted substance. The index of the amount of the eluted substance by the measurement of the liquid circulated for 4 hours represents the amount of the eluted substance during use of the hollow fiber membrane module, while the index of the amount of the eluted substance by the measurement of the initial washing liquid represents the amount of the eluted substance in an initial state of the hollow fiber membrane module.

For example, when the hollow fiber membrane module is used as an artificial kidney in hemodialysis, the consumption amount of potassium permanganate is preferably small. In an eluted substance test of a circuit in dialysis type artificial kidney permission reference, titration with an aqueous potassium permanganate solution (2.0×10$^{-3}$ mol/L) is carried out using 10 ml of the initial washing liquid. It is defined by the same reference that the consumption amount of the aqueous potassium permanganate solution during titration becomes 1 ml or less. The reference is a reference for the eluted substance test of the circuit and is severe as compared with the dialyzer permission reference. Therefore, there is no need for the hollow fiber membrane module to clear the reference in the present invention. The consumption amount of potassium permanganate of the initial washing liquid is preferably 3 mL or less, more preferably 2 mL or less, and still more preferably 1 mL or less, per 1 $m^2$ of the membrane area.

Means for reducing an elution amount of the hydrophilic polymer is preferably a method in which a washing liquid is selected while paying attention to an adsorption equilibrium constant of the hydrophilic polymer to the polysulfone-based polymer, and the hollow fiber membrane is washed. Specifically, it is preferred that a polymer having an adsorption equilibrium constant to the polysulfone-based polymer, which is higher than that of an adsorption equilibrium constant to the hydrophilic polymer added to a membrane forming stock solution, is selected and then the hollow fiber membrane is washed with a washing liquid containing the same. In the washing step, the hydrophilic polymer derived from the hydrophilic polymer, which is easy to elute, added to the membrane forming stock solution is replaced by a polymer having a higher adsorption equilibrium constant. Whereby, the amount of the hydrophilic polymer, which is easy to elute, contained in the hollow fiber membrane decreases. Meanwhile, the polymer having high adsorption equilibrium constant adsorbed to the hollow fiber membrane is not easily eluted as compared with the hydrophilic polymer. As a result, it is possible to obtain a hollow fiber membrane in which the elution amount of the hydrophilic polymer is controlled.

The polymer, whose adsorption equilibrium constant to the polysulfone-based polymer is higher than that of the hydrophilic polymer, is preferably a copolymer including a hydrophilic unit and a hydrophobic unit. Inclusion of the hydrophilic unit makes it easy to dissolve in water. Since the polysulfone-based polymer is hydrophobic, a polymer including a hydrophobic unit exhibits higher adsorption equilibrium constant as a result of a hydrophobic interaction with the polysulfone-based polymer. Although details are unclear; it is considered that the polymer including a hydrophilic unit and a hydrophobic unit generally has numerous intermolecular contact points with the polysulfone-based polymer, so that the polymer is likely to be crosslinked with the polysulfone-based polymer even under the condition that water does not exist and crosslinking due to radiation is less likely to occur.

The hydrophilic unit in the present invention refers to the unit in which solubility in 100 g of water at 20° C. of a polymer obtained by being composed only of the monomer unit is 1 g or more, among monomer units that constitute the polymer.

The hydrophobic unit in the present invention refers to the unit in which solubility in 100 g of water at 20° C. of a polymer obtained by being composed only of the monomer unit is less than 1 g, preferably 0.1 g or less, among monomer units that constitute the polymer.

Regarding the proportion between the hydrophilic unit and the hydrophobic unit in the polymer including a hydrophilic unit and a hydrophobic unit, small proportion of the hydrophobic unit in the hydrophilic group-containing polymer weakens the interaction with the hydrophobic polymer as the membrane material, and thus the polymer is less likely to obtain a merit of improving introduction efficiency. Meanwhile, large proportion of the hydrophobic unit may cause deterioration of hydrophilicity of the inner surface of the hollow fiber membrane, leading to deterioration of blood compatibility. Therefore, the proportion of the hydrophobic unit is preferably 20 mol % or more, and more preferably 30 mol % or more. Meanwhile, the proportion is preferably 80 mol % or less, and more preferably 70 mol % or less.

As mentioned below, in order to introduce an ester group into the surface of the functional layer, it is preferred that the polymer including a hydrophilic unit and a hydrophobic unit further has an ester group. In this case, the ester group preferably exists in the hydrophobic unit.

Specific examples of the polymer including a hydrophilic unit and a hydrophobic unit include a vinylpyrrolidone/vinylcaprolactam copolymer, a vinylpyrrolidone/vinyl alcohol copolymer, and the like. Specific examples of the polymer including a hydrophilic unit and a hydrophobic unit, and also having an ester group include a polyvinyl alcohol having a saponification degree of less than 99%, a vinylpyrrolidone/vinyl acetate copolymer, and the like. It is preferred to contain any one of these polymers. Of these polymers, at least one selected from a vinylpyrrolidone/vinyl acetate copolymer and a vinylpyrrolidone/vinylcaprolactam copolymer is suitably used from the viewpoint of compatibility with the polysulfone-based polymer.

Examples of the method of washing a hollow fiber membrane with a washing liquid include a method in which a washing bath is provided in a spinning step of a hollow fiber membrane and the hollow fiber membrane is allowed to pass through a washing liquid in the bath; a method in which hollow fiber membranes are bundled to obtain a hollow fiber membrane bundle, which is immersed in a washing liquid; a method in which a hollow fiber membrane is inserted into a case to obtain a hollow fiber membrane module and then a washing liquid is fed to the hollow fiber membrane module and allowed to flow to the inner surface side and the outer surface side of the hollow fiber membrane; and a method in which a washing liquid is fed to a hollow fiber membrane module in the same manner, and then the washing liquid is allowed to flow in a membrane thickness direction of the hollow fiber membrane. There is no particular limitation on the method, and the method is suitably a method in which after forming a hollow fiber membrane module, a washing liquid is allowed to pass toward a membrane thickness direction, because of high washing efficiency of the hydrophilic polymer. When the polymer including a hydrophilic unit and a hydrophobic unit to be added to the washing liquid has satisfactory biocompatibility, it is also possible to simultaneously performing washing of a hydrophilic polymer and imparting of high biocompatibility to the surface of the functional layer by allowing a washing liquid to pass in a membrane thickness direction from the surface of the functional layer of the hollow fiber membrane to the opposite surface. When a washing liquid is allowed to pass in a membrane thickness direction, washing time is preferably 10 seconds or more, more preferably 30 seconds or more, and still more preferably 1 minute or more. Meanwhile, too long washing time may lead to excess hydrophilic polymer of the surface of the membrane, thus increasing the eluted substance, so that the washing time is preferably 30 minutes or less, and 10 minutes or less. The flow rate of the washing liquid is suitably in a range of 200 to 1,000 mL/min.

Too small amount of the polymer to be added to the washing liquid may not lead to exertion of insufficient washing effect, and the amount is preferably in a range of 0.002% by mass or more, more preferably 0.005% by mass or more, and still more preferably 0.0075% by mass or more. Meanwhile, too large amount of the polymer contained may lead to elution of the polymer, and the amount is preferably 0.05% by mass or less, more preferably 0.03% by mass or less, and still more preferably 0.02% by mass or less. Too high temperature of the washing liquid may lead to deterioration of performance of the membrane, and the temperature is preferably 100° C. or lower and more preferably 90° C. or lower. It is not preferred to increase the temperature of the washing liquid in view of manufacturing efficiency because of requiring equipment for heating. However, high temperature may lead to relatively increased hydrophobicity in the polymer since a hydration state of the polymer including a hydrophilic unit and a hydrophobic unit becomes unstable. Namely, the adsorption equilibrium constant to the polysulfone-based polymer increases, leading to an improvement in washing efficiency. The temperature of the washing liquid is preferably 25° C. or higher, more preferably 50° C. or higher, and still more preferably 70° C. or higher.

As another method of reducing an elution amount of a hollow fiber hydrophilic polymer, a method of adding a polymer having high adsorption equilibrium constant to the polysulfone-based polymer to an injection liquid during forming of a hollow fiber membrane is also effective. The addition of the polymer having high adsorption equilibrium constant to the injection liquid may cause replacement by the hydrophilic polymer added to the membrane forming stock solution on the surface of the membrane during membrane forming. The amount of the polymer having high adsorption equilibrium constant to be added to the injection liquid is preferably 0.002% by mass or more, more preferably 0.005% by mass or more, and still more preferably 0.0075% by mass. Meanwhile, too large amount of the polymer may lead to elution of the polymer, and the amount is preferably 0.05% by mass or less, more preferably 0.03% by mass or less, and still more preferably 0.02% by mass or less. When the polymer having high adsorption equilibrium constant is added to the injection liquid, the above-mentioned washing with a washing liquid may be performed using water or hot water.

Regarding the hollow fiber membrane of an embodiment of the present invention, a flexible layer exists on a surface of a functional layer in a wet state, and the thickness of the flexible layer is 7 nm or more. The surface of the functional layer in the present invention means the surface in contact with a substance to be treated which is allowed to flow in the hollow fiber membrane module. Taking a hollow fiber membrane module to be used in a dialysis treatment as an example, the surface at the side in contact with blood is the surface of the functional layer surface. The thickness of the flexible layer means the value obtained by measuring the surface of the functional layer of the hollow fiber membrane in the following manner using an atomic force microscope (AFM). The flexible layer is the layer formed by swelling a hydrophilic polymer existing on the surface of the hollow fiber membrane with moisture. Here, the wet state may be a state where the water content of the hollow fiber membrane is 65% by mass or more. It is possible to estimate the reason why such flexible layer is important as follows. Components having a large size, such as platelets and blood cells, is in contact with only the surface of the functional layer without incorporating into the hollow fiber membrane. Therefore, it is considered that, as the flexible layer becomes thick, platelets and blood cells are less likely to approach the polysulfone-based polymer, and thus neither adhesion nor activation occurs. Meanwhile, too thick flexible layer may lead to trapping of a protein by the flexible layer. As mentioned above, the thickness of the flexible layer is preferably 7 nm or more, and more preferably 10 nm or more. The thickness of the flexible layer is preferably 50 nm or less, more preferably 40 nm or less, still more preferably 30 nm or less, and yet more preferably 20 nm or less.

Figure 2:
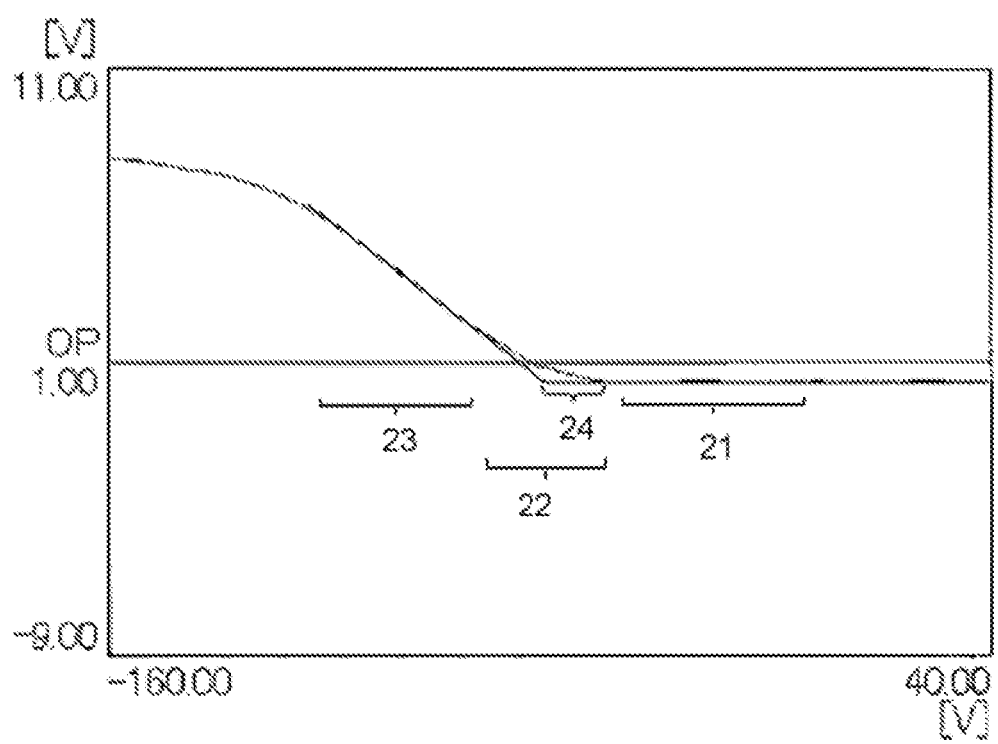
FIG. 2 is an example of a force curve showing a relationship between a force exerted on a cantilever and a displacement amount of the cantilever in the measurement using an atomic force microscope.

The thickness of the flexible layer on the surface of the functional layer in a wet state is calculated from the measurement results of a force curve obtained by observing using an atomic force microscope (AFM). An example of a force curve showing a relationship between a force exerted on a cantilever and a displacement amount of the cantilever in the measurement using an atomic force microscope is illustrated in FIG. 2. The force curve is expressed by a graph in which a vertical axis is for the force exerted on a cantilever, and a horizontal axis for the displacement amount of a cantilever. In a region 21 before the cantilever is in contact with the surface of the functional layer, the force curve transits in parallel to the x-axis. After the cantilever is in contact with the surface of the functional layer, when the flexible layer does not exist, the force exerted on the cantilever increases linearly to the displacement amount of the cantilever, while there is a linear relationship between the displacement amount of the cantilever and the force exerted on the cantilever. However, when the flexible layer exists on the surface of the functional layer, after contact of the cantilever with the surface of the functional layer, a curved nonlinear region 22 appears on the force curve. After passing the nonlinear region, there appears a region 23 in which a linear relationship is obtained between the displacement amount of the cantilever and the force exerted on the cantilever. The thickness 24 of the flexible layer is defined as a distance from a starting point of a nonlinear region 22 appeared after contact of the cantilever with the surface of the functional layer to an intersection point between an extended line and the linear region 23, on the extended line drawn with respect to a line of the region 21 in which the force curve shifts in parallel to the x-axis before contact of the cantilever with the surface of the functional layer. It is preferred that the measurement is performed at arbitrary 20 positions of plural hollow fiber membranes selected optionally and an average is determined. There is no need that the measurement is necessarily performed with respect to plural hollow fiber membranes. A value, which is obtained by rounding off the first decimal position of the resulting calculated value, is used.

Too large water content of the hollow fiber membrane module may cause a fear of bacterial growth during storage or may cause freezing of the hollow fiber membrane, leading to deterioration of performance. When irradiated with radiation in a state of a high water content, crosslinking and gelation of the hydrophilic polymer occurs, which may exert an influence on membrane performance. Meanwhile, a low water content dry-type one enables weight saving of the hollow fiber membrane module, which leads to reduced transport cost and an improved safety. In a dry-type hollow fiber membrane module with a substantially dry hollow fiber membrane, defoamability during use is improved. Thus, the water content of the hollow fiber membrane built in the hollow fiber membrane module is preferably 10% by mass or less, more preferably 7% by mass or less, still more preferably 4% by mass or less, particularly preferably 2% by mass or less, and most preferably 1% by mass or less, relative to the mass of the hollow fiber membrane.

Here, the water content in the present invention is calculated by the equation: water content (% by mass)=100×(a−b)/c, after measuring (a) mass of a hollow fiber membrane module or a hollow fiber bundle before drying, (b) mass of a hollow fiber membrane module after drying the hollow fiber membrane until reaching an absolute dry state, and (c) mass of a hollow fiber bundle during absolute drying.

When measuring in a state of a hollow fiber membrane bundle, the water content is calculated by the equation: water content (% by mass)=100×(d−e)/e after measuring (d) mass of a hollow fiber bundle before drying and (e) mass of a hollow fiber membrane bundle in an absolute dry state. In any case, a value, which is obtained by rounding off the second decimal position of the resulting measured value, is used.

Examples of the method of drying a hollow fiber membrane include a method in which drying is performed by allowing a gas such as compressed air to flow into hollow fiber membrane module, a method in which drying is performed by irradiating with a microwave, a method such as vacuum drying, and the like.

In view of blood compatibility, an ester group preferably exists on the surface of the functional layer of the hollow fiber membrane. The existence of the ester group on the surface of the functional layer of the hollow fiber membrane enables suppression of adhesion of protein and platelets. Although detailed mechanism is unclear, it is considered that when the ester group has appropriate hydrophilicity, and a state of water on the surface of the functional layer and a state of water around protein become almost the same state, thus enabling suppression of non-specific adsorption of protein.

Although there is no particular limitation on the method of introducing the ester group into the surface of the functional layer, it is preferred since the ester group can be introduced in a comparatively simple manner when using, as a polymer to be added to the washing liquid and the injection liquid, a polymer including a hydrophilic unit and a hydrophobic unit, and also having an ester group. The inventors have also found that the ester group generates a radical under irradiation with radiation, comparatively easily, and a radical reaction enables immobilization to the membrane even under the condition of low water content. It is a particularly preferred method in which a polymer including a hydrophilic unit and a hydrophobic unit, and also having an ester group is added to the washing liquid, and a washing step is performed as mentioned above. Whereby, the hydrophilic polymer is replaced by the polymer including a hydrophilic unit and a hydrophobic unit, and also having an ester group, not only on the surface of the hollow fiber membrane, but also inside the hollow fiber membrane. In other words, the content of the hydrophilic polymer is also reduced inside the hollow fiber membrane, thus containing the polymer having an ester group. Whereby, it has been found that elution of the hydrophilic polymer can be suppressed even in a state where the hydrophilic polymer is neither crosslinked nor gelated.

The amount of the ester group in the surface of hollow fiber membrane can be determined by measuring the amount of carbon derived from an ester group in the surface of hollow fiber membrane using an X-ray photoelectron spectroscopy (XPS). In order to exert the effect of suppressing adhesion of protein and platelets, an area percentage of a carbon peak derived from an ester group, as measured by X-ray photoelectron spectroscopy (XPS), is preferably 1 (atomic %) or more, more preferably 1.2 (atomic %) or more, and still more preferably 1.5 (atomic %) or more, on the assumption that the total peak area derived from carbon in the surface of the functional layer is 100 (atomic %). Meanwhile, too large amount of the ester group may sometimes lead to deterioration of performance of the membrane, so that the area percentage of a carbon peak derived from an ester group is preferably 10 (atomic %) or less, and more preferably 5 (atomic %) or less.

In the case of determining the content of carbon derived from an ester group in the surface of the hollow fiber membrane can be measured using X-ray photoelectron spectroscopy (XPS), values measured at an angle of 90° are used. At a measurement angle of 90°, a region from the surface to a depth of about 10 nm is detected. The average of values measured at three places are used. The carbon peak derived from an ester group (COO) can be determined by deconvoluting peaks observed in the range from the main C1s peak derived from CH or C—C to the peak at +4.0 to +4.2 eV. The content of carbon derived from an ester group (atomic %) is determined by calculating the ratio of the peak area derived from an ester group to the total peak area derived from carbon. More specifically, C1s peaks are composed of five components: a component mainly derived from CHx, C—C, C=C, C—S; a component mainly derived from C—O, C—N; a component derived from π-π* satellite; a component derived from C=O; and a component derived from COO. Therefore, the peaks are deconvoluted into the five components. The COO-derived component corresponds to the peak observed at +4.0 to +4.2 eV from the main CHx or C—C peak (at about 285 eV). The peak area ratio of each component is calculated by rounding off the second decimal place. As a result of peak deconvolution, a ratio of 0.4% or less is determined to be the detection limit.

It is possible to measure the amount of a polymer having an ester group in a range of several micrometers (μm) in a depth direction from the surface of the functional layer by total reflection infrared spectroscopy (ATR). ATR measuring method is as follows: infrared absorption spectrum is measured at 25 points in a measurement area of 3 μm×3 μm with a cumulative number of 30 or more. From individual infrared absorption spectra, $(A_{COO})$ $(A_{CC})$ is determined by the following method to thereby determine an average of 25 points. A base line is drawn on the resulting infrared absorption spectrum in a range of 1,711 to 1,759 cm$^{-1}$, and the peak area surrounded by the base line and the positive part of the spectrum is determined to be the peak area $(A_{COO})$ derived from an ester group. Similarly, a base line is drawn in a range of 1,549 to 1,620 cm$^{-1}$, and the peak area surrounded by the base line and the positive part of the spectrum is determined to be the peak area $(A_{CC})$ derived from a benzene ring C=C of polysulfone. The ratio between them $(A_{COO})/(A_{CC})$ is then calculated. The 25-point measurement is performed at three different places in the vicinity of both ends and around the longitudinal center per one hollow fiber membrane, with respect to three hollow fiber membranes per one module, and an average of 9 points (=3×3) is determined to be an average of $(A_{COO})/(A_{CC})$. The average of $(A_{COO})/(A_{CC})$ is preferably 0.02 or more, more preferably 0.03 or more, and still more preferably 0.05 or more. Meanwhile, too large proportion of the ester group may lead to strong hydrophobicity of the surface, resulting in deterioration of blood compatibility, so that the average is preferably 0.5 or less, more preferably 0.3 or less, and still more preferably 0.15 or less.

The method for manufacturing a hollow fiber membrane module of an embodiment of the present invention includes the steps of:

mixing a base material composed of a hydrophobic polymer with a hydrophilic polymer including no hydrophobic unit to produce a hollow fiber membrane;

washing the hollow fiber membrane with a washing liquid containing 0.002% by mass or more and 0.05% by mass or less of a polymer including a hydrophilic unit and a hydrophobic unit, and also having an ester group; and building the hollow fiber membrane in a module case, and irradiating the hollow fiber membrane under the conditions that the concentration of oxygen in the atmosphere around the hollow fiber membrane is in a range of 0 to 1%, and the water content relative to the mass of the hollow fiber membrane is in a range of 0 to 25% by mass.

First, a method for manufacturing a hollow fiber membrane will be described. The hollow fiber membrane is preferably a membrane having an asymmetric structure composed of a layer contributing to the separation performance and a supporting layer contributing to the mechanical strength of the membrane in view of permeability and separation performance Such a hollow fiber membrane is preferably produced by discharging a membrane forming stock solution containing a hydrophobic polymer, a good solvent thereof, and a poor solvent thereof through a slit part of a double annulation spinneret, simultaneously discharging the injection liquid through a circular tube part, allowing the discharged membrane forming stock solution to pass through a dry part, and coagulating in a coagulation bath.

Here, the good solvent means a solvent which dissolves a polysulfone-based polymer in the membrane forming stock solution. N,N-dimethylacetamide and N-methylpyrrolidone are suitably used because of solubility, although there is no particular limitation. Meanwhile, the poor solvent means a solvent which does not dissolve a polysulfone-based polymer in the membrane forming stock solution. Water is suitably used, although there is no particular limitation.

The mechanical strength of the hollow fiber membrane can be increased by increasing the concentration of the polysulfone-based polymer in the membrane forming stock solution. Meanwhile, too large concentration of the polysulfone-based polymer may cause problems such as decrease in solubility and poor discharge due to an increase in viscosity of the membrane forming stock solution. The concentration of the polysulfone-based polymer enables the adjustment of permeability and molecular weight cutoff. Increase in concentration of the polysulfone-based polymer may cause an increase in density of the inner surface of hollow fiber membrane, leading to deterioration of permeability and molecular weight cutoff. Thus, the concentration of the polysulfone-based polymer in the membrane forming stock solution is preferably 24% by mass or less, while the concentration of the polysulfone-based polymer is preferably 12% by mass or more.

In the case of forming a hollow fiber membrane, there is a need to mix a hydrophilic polymer as a pore forming agent so as to adjust the viscosity of a membrane forming stock solution. Examples of the hydrophilic polymer include, but are not limited to, polyethylene glycol, polyvinyl alcohol, polyvinylpyrrolidone, carboxymethyl cellulose, polypropylene glycol, and the like. Of these polymers, polyvinylpyrrolidone is suitably used from the viewpoint of compatibility with the polysulfone-based polymer and safety.

However, such hydrophilic polymer added to the membrane forming stock solution, especially a low molecular weight hydrophilic polymer, often causes formation of an eluted substance after irradiation with radiation. The reason is considered as follows. In the case of a membrane forming stock solution prepared by using polysulfone as the polysulfone-based polymer and polyvinylpyrrolidone as the hydrophilic polymer, elution occurs because of low adsorption equilibrium constant of polysulfone and polyvinylpyrrolidone. As mentioned below, when the water content is low during irradiation with radiation, a crosslinking reaction due to irradiation with radiation is less likely to occur, so that elution of the hydrophilic polymer is more likely to occur. Therefore, it is effective to reduce an eluted substance by washing the hollow fiber membrane using the above-mentioned washing method.

It is expected that the hydrophilic polymer mixed in the membrane forming stock solution serves as a pore forming agent and exerts the effect of improving permeability and hydrophilicity of the thus obtained hollow fiber membrane. It is possible to adjust the viscosity of the membrane forming stock solution by mixing the hydrophilic polymer, thus enabling suppression of formation of macrovoids causing decrease in strength of the membrane. Too large amount of the hydrophilic polymer to be mixed in the membrane forming stock solution may sometimes cause decrease in solubility and poor discharge due to increase in viscosity of the membrane forming stock solution. Remaining of a large amount of the hydrophilic polymer in the hollow fiber membrane may lead to deterioration of permeability due to increase in permeation resistance. Although an optimum amount of the hydrophilic polymer to be added to the membrane forming stock solution varies depending on types thereof and objective performances, the amount is preferably 1% by mass or more, while the amount is preferably 15% by mass or less, based on the entire membrane forming stock solution. There is no particular limitation on the hydrophilic polymer to be added to the membrane forming stock solution, and polyvinylpyrrolidone is suitably used because of its high compatibility with the polysulfone-based polymer. The hydrophilic polymer may be used alone, or two or more hydrophilic polymers may be used as a mixture.

In order to improve permeability of the hollow fiber membrane, a hydrophilic polymer with comparatively low molecular weight is suitably used since pore forming action is increased. When using a low molecular weight hydrophilic polymer, elution from the hollow fiber membrane is likely to occur. However, according to the present invention, such elution can be reduced.

When the polysulfone-based polymer is melted so as to obtain a membrane forming stock solution, the polymer is preferably melted at high temperature so as to improve solubility, but may cause denaturation of the polymer due to heat, and change in composition due to vaporization of the solvent. Therefore, the melting temperature is preferably 30° C. or higher and 120° C. or lower. Optimum range of the melting temperature sometimes varies depending on the type of the polysulfone-based polymer and additives.

The injection liquid used during formation of a hollow fiber membrane is a mixed solution of a good solvent and a poor solvent to a polysulfone-based polymer, and permeability and molecular weight cutoff of the hollow fiber membrane can be adjusted by the ratio between them. There is no particular limitation on poor solvent, and water is suitably used. There is no particular limitation on good solvent, and N,N-dimethylacetamide is suitably used.

When the membrane forming stock solution is in contact with the injection liquid, phase separation of the membrane forming stock solution is induced by the action of the poor solvent and thus coagulation proceeds. When the ratio of the poor solvent in the injection liquid is excessively increased, permeability and molecular weight cutoff of the membrane deteriorate. Meanwhile, when the ratio of the poor solvent in the injection liquid is excessively increased, the solution is dropped in a state of liquid, thus failing to obtain a hollow fiber membrane. Proper ratio of both solvents in the injection liquid varies depending on the type of the good solvent and the poor solvent. The proportion of poor solvent is preferably 10% by mass or more in the mixed solvent of both solvents, while the proportion is preferably 80% by mass or less. The concentration of the good solvent in the injection liquid is preferably 40% by mass or more, and still more preferably 50% by mass or more, while the concentration is preferably 90% by mass or less, more preferably 80% by mass or less, and still more preferably 70% or less. As mentioned above, a polymer including a hydrophilic unit and a hydrophobic unit may be added to the injection liquid.

The temperature of a double annulation spinneret during discharging exerts an influence on viscosity of the membrane forming stock solution, phase separation behavior, and rate of diffusion of the injection liquid into the membrane forming stock solution. In general, the higher the temperature of the double annulation spinneret, permeability and molecular weight cutoff of the resulting hollow fiber membrane increase. Too high temperature of the double annulation spinneret may cause unstable discharging due to a decrease in viscosity of the membrane forming stock solution and deterioration of coagulant property, leading to deterioration of spinnability. Meanwhile, low temperature of the double annulation spinneret may cause deposition of water to the double annulation spinneret due to dew condensation. Therefore, the temperature of the double annulation spinneret is preferably 20° C. or higher, while the temperature of the double annulation spinneret is preferably 90° C. or lower.

The membrane forming stock solution was discharged through a double annulation spinneret, allowed to pass through a dry part and then coagulated by immersing in a coagulation bath. At the dry part, when the outer surface of the membrane forming stock solution is in contact with air, moisture in air is incorporated and serves as poor solvent, and thus phase separation of membrane forming stock solution proceeds. Therefore, open porosity of the outer surface of the thus obtained hollow fiber membrane can be adjusted by controlling a dew point of the dry part. If the dew point of the dry part is low, phase separation does not sometimes sufficiently proceed and open porosity of the outer surface may decrease, so that friction of the hollow fiber membrane increases, leading to deterioration of spinnability. Meanwhile, even when the dew point of the dry part is too high, the outer surface may be sometimes coagulated, leading to a decrease in open porosity. The dew point of the dry part is preferably 60° C. or lower, while the dew point is preferably 10° C. or higher.

When the dry part length is too short, coagulation occurs before phase separation of the membrane forming stock solution sufficiently proceeds, leading to deterioration of permeability and fractionation performance. Therefore, the dry part length is preferably 50 mm or more, and more preferably 100 mm or more. Meanwhile, when the dry part length is too long, spinning stability may deteriorate by fiber sway, so that the dry part length is preferably 600 mm or less.

A coagulation bath contains a poor solvent to a polysulfone-based polymer as a main component and a good solvent is optionally added. Water is suitably used as the poor solvent. When the membrane forming stock solution enters into the coagulation bath, the membrane forming stock solution is coagulated by a large amount of the poor solvent in the coagulation bath and the membrane structure is fixed. Since coagulation is suppressed by more increasing the temperature in the coagulation bath, permeability and molecular weight cutoff increase.

It is preferred for the hollow fiber membrane obtained by coagulating in the coagulation bath to be washed with water, as mentioned above, since the hollow fiber membrane contains an excess hydrophilic group-containing polymer derived from the solvent and the stock solution. Insufficient washing with water may lead to complicated washing before use of the hollow fiber membrane module, and also may cause a problem such as flow of the eluted substance into the liquid to be treated.

Since a film coefficient of material transfer can be reduced as the thickness of the hollow fiber membrane decreases, substance removing performance of the hollow fiber membrane is improved. Meanwhile, when the membrane has too small thickness, fiber breakage and drying collapse are likely to occur, which may lead to problems about production. Ease of collapse of the hollow fiber membrane has a correlation with the thickness and the inner diameter of the hollow fiber membrane. Therefore, the thickness of the hollow fiber membrane is preferably 20 μm or more, and more preferably 25 μm or more. Meanwhile, the thickness is preferably 50 μm or less, and more preferably 45 μm or less. The inner diameter of the hollow fiber membrane is preferably 80 μm or more, more preferably 100 μm or more, and still more preferably 120 μm or more, while the inner diameter is preferably 250 μm or less, more preferably 200 μm or less, and still more preferably 160 μm or less.

The inner diameter of the hollow fiber membrane refers to the value obtained by measuring each thickness of 16 hollow fiber membranes selected at random using lens (VH-Z100; KEYENCE CORPORATION) at a magnification of 1,000 times of a microwatcher to determine an average "a", followed by calculation according to equation mentioned below. The outer diameter of the hollow fiber membrane refers to the value obtained by measuring each outer diameter of 16 hollow fiber membranes selected at random using a laser displacement meter (e.g. LS5040T; KEYENCE CORPORATION).

Inner diameter (μm) of hollow fiber membrane=outer diameter of hollow fiber membrane−2×membrane thickness The hollow fiber membrane module is obtained by building the hollow fiber membrane thus obtained in a case. A non-limiting example of the method for building the hollow fiber membrane into the case is shown below. First, the hollow fiber membrane is cut into the desired length, and a desired number of the cut pieces are bundled and then placed in a cylindrical case. Thereafter, both ends are temporarily capped, and a potting material is added to both ends of the hollow fiber membrane. In this process, a method of adding a potting material while rotating the module by means of a centrifugal machine is preferred, because the potting material can be uniformly charged. After the potting material is solidified, both ends are cut in such a manner that openings can be formed at both ends of the hollow fiber membrane. A header is attached to both sides of the case, and then the nozzle of the header and the case is plugged to obtain a hollow fiber membrane module.

There is a need for a hollow fiber membrane module for blood purification, such as artificial kidney, to be subjected to sterilization, and a radiation sterilization method is often used in view of low persistence and simplicity. The radiation to be used may be α radiation, β radiation, γ radiation, X-ray, ultraviolet radiation, electron beam, or the like. Of these, γ radiation or electron beam is suitably used in view of low persistence and simplicity. The polymer including a hydrophilic unit and a hydrophobic unit incorporated into an inner surface of a hollow fiber can be fixed by causing crosslinking with a membrane material due to irradiation with radiation, which may lead to reduction in eluted substance.

Therefore, irradiation with radiation is preferably performed. Low radiation dose may lead to low sterilization effect, while high radiation dose may cause decomposition of the polymer including a hydrophilic unit and a hydrophobic unit or the membrane material, leading to deterioration of blood compatibility. Therefore, the radiation dose is preferably 15 kGy or more, and preferably 100 kGy or less.

To suppress crosslinking and gelation of a polysulfone-based polymer and a hydrophilic polymer due to radiation, it is preferred to irradiate with radiation in a state where the water content of the hollow fiber membrane is low. Therefore, the water content of the hollow fiber membrane during irradiation with radiation is preferably 25% by mass or less, more preferably 10% by mass or less, still more preferably 7% by mass or less, yet preferably 4% by mass or less, particularly preferably 2% by mass or less, and most preferably 1% by mass or less.

When the oxygen concentration around the hollow fiber membrane is high during irradiation with radiation, an oxygen radical is likely to be generated by irradiation with radiation. In a state where the water content of the hollow fiber membrane is low, there may arise deterioration of the membrane and increase in eluted substance. Irradiation with radiation is preferably performed under the condition that the oxygen concentration in the atmosphere around the hollow fiber membrane is 1% or less, more preferably 0.5% or less, still more preferably 0.2% or less, and particularly preferably 0.1% or less. Use of an oxygen densitometer enables the measurement of the oxygen concentration inside the module.

Examples of the method of reducing the oxygen concentration inside the hollow fiber membrane module include a method in which an inert gas is allowed to flow into a hollow fiber membrane module, and a method using an oxygen scavenger. However, in the method using an oxygen scavenger, the oxygen scavenger requires high cost, and there is a need to use, as a packaging container of the hollow fiber membrane, a packaging container with low oxygen permeability. Therefore, a method of filling an inert gas is suitable. It is possible to achieve a low oxygen concentration state in the atmosphere around the hollow fiber membrane using an inert gas, by allowing an inert gas to flow into a hollow fiber membrane module and hermetically sealing all inlets of the hollow fiber membrane module, or allowing an inert gas to flow into a hollow fiber membrane module and putting the hollow fiber membrane module in a packaging bag with low oxygen permeability, followed by sealing.

Too high humidity around the hollow fiber membrane and inside the packaging container may cause dew condensation and freezing at low temperature, leading to deterioration of performance. Therefore, the relative humidity at 25° C. around the hollow fiber membrane and inside the packaging container is preferably less than 80% Rh, more preferably 60% Rh, and more preferably less than 40 Rh %. The relative humidity as used herein is represented by the equation: Relative humidity (% Rh)=100×p/P, using a steam partial pressure (p) at room temperature and a saturated steam pressure (P) at room temperature.

The permeability of the hollow fiber membrane is preferably 100 ml/hr/mmHg/m² or more, more preferably 200 ml/hr/mmHg/m² or more, and still more preferably 300 ml/hr/mmHg/m² or more. In the case of artificial kidney application, too high permeability may cause a phenomenon such as residual blood, so that the permeability is preferably 2,000 ml/hr/mmHg/m² or less, and more preferably 1,500 ml/hr/mmHg/m² or less. The permeability (UFR) is calculated by the following formula:

$$\text{UFR (mL/hr/m}^2\text{/mmHg)} = Qw/(P \times T \times A)$$

where Qw: filtration amount (mL), T: flow out time (hr), P: pressure (mmHg), and A: inner surface area (m²) of hollow fiber membrane.

Blood compatibility in the inner surface of the hollow fiber membrane can be evaluated by the number of platelets adhered to the hollow fiber membrane. Since a large number of adhered platelets may lead to blood coagulation, it can be said that the inner surface of the hollow fiber membrane has poor blood compatibility. The number of platelets adhered to the inner surface of the hollow fiber membrane can be evaluated by observing the inner surface of the hollow fiber membrane after contact with human blood using a scanning electron microscope. Details of the evaluation conditions will be mentioned below by Examples. When the inner surface of the sample is observed at a magnification of 1,500 times, the number of the adhered platelets per field ($4.3 \times 10^3$ µm²) is preferably 20 platelets or less, more preferably 10 platelets or less, still more preferably 8 platelets or less, and particularly preferably 4 platelets or less. An average obtained by rounding off the first decimal position of the number of the adhered platelets, observed different ten fields, is used.

EXAMPLES (1) Measurement of Amount of Insoluble Component

After weighing 1 g of a hollow fiber membrane in an Erlenmeyer flask, 40 mL of DMAc was added, followed by stirring for 2 hours. Then, centrifugation was performed at 2,500 rpm to thereby precipitate an insoluble component and the supernatant was removed. To the insoluble component thus obtained, 10 mL of DMAc was added and the insoluble component was washed, and then the supernatant was removed by centrifugation. This operation was repeated three times. Finally, the supernatant was removed and the thus obtained insoluble component was freeze-dried. The dry mass of the insoluble component was measured and the value of dry mass/1 g (mass of hollow fiber membrane)×100 was determined to be the content (% by mass) of the insoluble component relative to the entire mass of the hollow fiber membrane. A value, which is obtained by rounding off the second decimal position of the resulting calculated value, was used.

(2) Eluted Substance Test

Ultrapure water heated to 37° C. was allowed to pass through a passage of the inner surface side of the hollow fiber membrane of the hollow fiber membrane module at a rate of 100 mL/min for 7 minutes, and allowed to pass through a passage of the outer surface side of the hollow fiber membrane at a rate of 500 mL/min for 5 minutes, and again allowed to pass through a passage of the inner surface side of the hollow fiber membrane at a rate of 100 mL/min for 3 minutes, thereby washing the hollow fiber membrane. Subsequently, 4 L of ultrapure water heated to 37° C. was allowed to pass through the inner surface side of the hollow fiber membrane while circulating at a rate of 200 mL/min for 4 hours and, after circulation for 4 hours, water was collected to obtain a sample solution. Since the sample solution thus obtained is a dilute solution, the sample solution was concentrated 100 times by freeze-drying and then subjected to the measurement by gel filtration chromatography. The measurement by gel filtration chromatography was carried out under the following conditions.

Column: TSKgel GMPWXL (manufactured by TOSOH CORPORATION)
Solvent: 0.1 mol/L lithium nitrate, water/methanol: 50 vol/ 50 vol
Flow rate: 0.5 mL/min
Column temperature: 40° C.
Detector: Differential refractometer RI-8010 (manufactured by TOSOH CORPORATION).

First, the measurement by gel filtration chromatography was carried out using, as standard samples, several types of aqueous solutions prepared by dissolving polyvinylpyrrolidone (K90, manufactured by ISP) while changing the concentration. A calibration curve having a relationship between a peak area of polyvinylpyrrolidone as standard samples and the concentration adjusted was made. Then, the concentration of an eluted substance in the sample solution was calculated from the total value of all peak areas obtained by measuring the sample solution and the calibration curve.

Subsequently, the amount of a hydrophilic polymer contained in 4 L of ultrapure water after circulation for 4 hours was calculated by the following equation. At this time, calculation was performed by approximating 1 L of pure water as 1 kg. A value, which is obtained by rounding off the second decimal position of the resulting calculated value, was used.

Amount of hydrophilic polymer in 4 L (mg)=concentration (ppm) of hydrophilic polymer in measurement sample×4 (kg)/100

The value, obtained by dividing the thus obtained amount (mg) of a hydrophilic polymer in 4 L of water after circulation for 4 hours by total value ($m^2$) of an inner surface area of a hollow fiber membrane filled into the measured hollow fiber membrane module, was determined to be an amount of an eluted substance ($mg/m^2$) in the present invention. A value, which is obtained by rounding off the second decimal position of the resulting calculated value, is used.

Amount of eluted substance ($mg/m^2$)=amount of hydrophilic polymer in 4 L (mg)/total value of inner surface area of hollow fiber membrane ($m^2$)

Total value of inner surface area of hollow fiber membrane ($m^2$)=π×hollow fiber membrane inner diameter (m)×effective length (m)×number of hollow fiber membrane Here, an effective length means a portion in which a potting material is not deposited in a hollow fiber membrane filled into a hollow fiber membrane module.

(3) Measurement of Flexible Layer of Hollow Fiber Surface

A hollow fiber membrane was sliced into a semi-cylindrical shape using a single-edged knife, and an inner surface was measured using an atomic force microscope (AFM). The measurement sample was rinsed with ultrapure water, dried at room temperature under 0.5 Torr for 10 hours, and then subjected to the measurement.

The hollow fiber membrane was attached onto a sample stage, water droplets were dropped over the membrane to moisten the membrane, thereby making the membrane in a moistened state having a water content of 65% by mass or more. In this state, a force curve measurement was carried out in a contact mode. A careful attention was paid so as not to dry the surface of the sample during the measurement. An example of a force curve in which a force exerted on a cantilever is plotted on a vertical axis, and a displacement amount of a cantilever is plotted on a horizontal axis is illustrated in FIG. 2. In the measurement results, when a flexible layer exists on a surface of a functional layer, after contact of the cantilever with the surface of the functional layer, a curved nonlinear region 22 is recognized in a force curve. After passing the nonlinear region, there appears a region 23 in which a linear relationship is obtained between the displacement amount of the cantilever and the force exerted on the cantilever. The thickness 24 of the flexible layer is defined as a distance from a starting point of a nonlinear region 22 appeared after contact of the cantilever with the surface of the functional layer to an intersection point between an extended line and the linear region 23, on the extended line drawn with respect to a line of the region 21 in which the force curve shifts in parallel to the x-axis before contact of the cantilever with the surface of the functional layer. The measurement was performed at arbitrary 20 positions of plural hollow fiber membranes selected optionally, and an average was used. A value, which is obtained by rounding off the first decimal position of the resulting calculated value, was used.

The AFM observation conditions were as follows: a scanning probe microscope SPM 9500-J3 (SHIMADZU, Kyoto, Japan) was used as an apparatus, the observation mode was a contact mode, the probe used was NP-S (120 mm, wide) (Nihon VEECO KK, Tokyo, Japan), the scanning range was 5 μm×5 μm, and the scanning speed was 1 Hz.

(4) Measurement of Water Content of Hollow Fiber Membrane

The mass of the thus obtained hollow fiber membrane module was measured to obtain a hollow fiber membrane module mass (a). This hollow fiber membrane module was placed in a vacuum dryer set at 50° C. and dried under 0.5 Torr for 12 hours, and then the measured mass was determined to be a hollow fiber membrane module mass (b) in an absolute dry state. Furthermore, another module obtained in the same manner was disassembled and a hollow fiber membrane was taken out. After vacuum drying at 50° C. under 0.5 Torr for 12 hours, the measured mass was determined to be the mass (c) of a hollow fiber membrane during absolute drying. The water content of the hollow fiber membrane was calculated by the following equation. A value, which is obtained by rounding off the second decimal position of the resulting measured value, is used.

Water content (% by mass)=100×($a-b$)/$c$

Where a: hollow fiber membrane module mass (g), b: hollow fiber membrane module mass (g) after absolute drying, and c: hollow fiber membrane mass (g) during absolute drying.

(5) Microscopic ATR Method

A hollow fiber membrane was sliced into a semi-cylindrical shape with a single-edged knife, rinsed with ultrapure water, and then dried at room temperature under 0.5 Torr for 10 hours to obtain a sample for the measurement of a surface. Each surface of the dried hollow fiber membrane was measured by a microscope ATR method using IRT-3000 manufactured by JASCO Corporation. The measurement was performed at one position in a field region (aperture) of 100 μm×100 μm in a measurement range of 3 μm×3 μm with a cumulative number of 30, and 5 points (lengthwise) by 5 points (widthwise) (25 points in total) were measured. A base line was drawn on the resulting spectrum in the wavelength range of 1,549 to 1,620 cm$^{-1}$, and the peak area surrounded by the base line and the positive part of the spectrum was determined to be a peak area ($A_{CC}$) derived from the benzene ring C=C of polysulfone. In the same manner, a base line was drawn on the spectrum in the range of 1,711 to 1,759 cm$^{-1}$, and the peak area surrounded by the base line and the positive part of the spectrum was determined to be a peak area ($A_{COO}$) derived from an ester group. An average of 25 points was determined by determining ($A_{COO}$)/($A_{CC}$).

The 25-point measurement is performed at three different places in the vicinity of both ends and around the longitudinal center per one hollow fiber membrane, with respect to three hollow fiber membranes per one module, and an average of 9 points (=3×3) is determined to be an average of ($A_{COO}$)/($A_{CC}$), and an average, which is obtained by rounding off the third decimal position of the resulting measured value, was used.

(6) Measurement of Adsorption Equilibrium Constant to Polysulfone Such as Hydrophilic Polymer After an Au sensor chip manufactured by GE Healthcare Bio-Sciences was fixed on a spin coater, one or two drops of a chlorobenzene solution of 0.1% by mass polysulfone (Udel (registered trademark)-P3500, Amoco) were put on the chip with a Pasteur pipette. Immediately after that, the spin coater was rotated at 3,000 rpm for 1 minute, so that an Au sensor chip having a thin layer of a polysulfone-based polymer on the surface was prepared. The sensor chip was inserted into BIACORE (registered trademark) 3000 manufactured by GE Healthcare Bio-Sciences. After the sensor chip was washed with water for 2,000 seconds, the processes described below were repeatedly performed with different aqueous hydrophilic polymer solutions at each of concentrations of 10, 100, 250, 500, and 1,000 ppm.

1. An aqueous hydrophilic polymer solution (750 µL) was allowed to flow to thereby adsorb the polymer to the surface of polysulfone.
2. Washing with water was performed for 2,000 seconds.
3. 0.025% by mass Triton (750 µL) was allowed to flow to thereby peel off the hydrophilic polymer adsorbed in 1.
4. Washing with water was performed for 2,000 seconds.

The amount of the polymer adsorbed to the surface of polysulfone-based polymer was determined as mentioned below. The value obtained after water washing for 2,000 seconds immediately after the insertion of the sensor chip was normalized as 0, and the amount of the polymer adsorbed to the surface was defined as the value of each difference obtained at the end of the operation 2. When the value obtained at completion of the operation 4 was higher than the value obtained after water washing immediately after the insertion of the sensor chip, it was assumed that the hydrophilic polymer was not completely peeled off with 0.025% by mass Triton, and the increase was added to the adsorbed amount. The above operations were repeated at each of the above concentrations, and the adsorption equilibrium constant was calculated from the resulting adsorption isotherm (in which a horizontal axis represents the concentration of the hydrophilic polymer, and a vertical axis represents the adsorbed amount) by least squares method for fitting, using a general solution adsorption model for a polymer and the adsorption surface thereof (approximation by Freundlich equation) (Equation 1):

$$Q=KC^n \quad \text{(Equation 1)}$$

(Q: adsorbed amount per unit area, K: adsorption equilibrium constant, and n: Freundlich constant).

(7) Method for Testing Adhesion of Human Platelets

A double-side tape was attached to an 18 mmϕ polystyrene circular plate, and the hollow fiber membrane was fixed thereon. The attached hollow fiber membrane was sliced into a semi-cylindrical shape with a single-edged knife so that the inner surface of the hollow fiber membrane was exposed. It should be carefully performed, because if there is dirt, a scratch, a fold, or the like on the inner surface of the hollow fiber, platelets may be adhered on such a portion so that the evaluation may not be correctly performed. The circular plate was attached to a cylindrical cut piece of Falcon (registered trademark) tube (No. 2051, 18 mmϕ) so that the hollow fiber membrane-carrying surface was placed inside the cylinder, and the gap was filled with Parafilm. The interior of the cylindrical tube was washed with a saline solution and then filled with a saline solution. Heparin was added at the concentration of 50 U/mL to healthy human venous blood immediately after the blood sampling. After the saline solution was discharged from the cylindrical tube, 1.0 mL of the blood was placed in the cylindrical tube within 30 minutes after the sampling and shaken at 37° C. for 1 hour. Thereafter, the hollow fiber membrane was washed with 10 mL of a saline solution and a 2.5% glutaraldehyde saline solution was added, and then the blood component adhered on the hollow fiber membrane was immobilized thereon by being left to stand. After a lapse of one or more hours, the blood component was washed with 20 mL of distilled water. The washed hollow fiber membrane was dried at normal temperature under a reduced pressure of 0.5 Torr for 10 hours. The hollow fiber membrane was then bonded to the sample stage of a scanning electron microscope with a double-side tape. A Pt—Pd thin film was then formed on the surface of the hollow fiber membrane by sputtering, so that a sample was obtained. The inner surface of the hollow fiber membrane sample was observed with a field emission-type scanning electron microscope (S-800, manufactured by Hitachi, Ltd.) at a magnification of 1,500 times, and the number of the adhered platelets per field (4.3×10$^3$ µm$^2$) was counted. The number of the adhered platelets (platelets/4.3×10$^3$ µm$^2$) was defined as the average of the numbers of the adhered platelets which were counted in 10 different fields at around the longitudinal center of the hollow fiber. A value, which is obtained by rounding off the first decimal position of the resulting calculated value, was used. When the number of the adhered platelets exceeds 50 platelets/4.3×10$^3$ µm$^2$ per field, it was counted as 50 platelets. The longitudinal ends of the hollow fiber were omitted from the objects to be measured for the number of adhesion, because blood tended to stay thereon.

(8) Measurement of Time-Dependent Change of Albumin Sieving Coefficient

Figure 3:
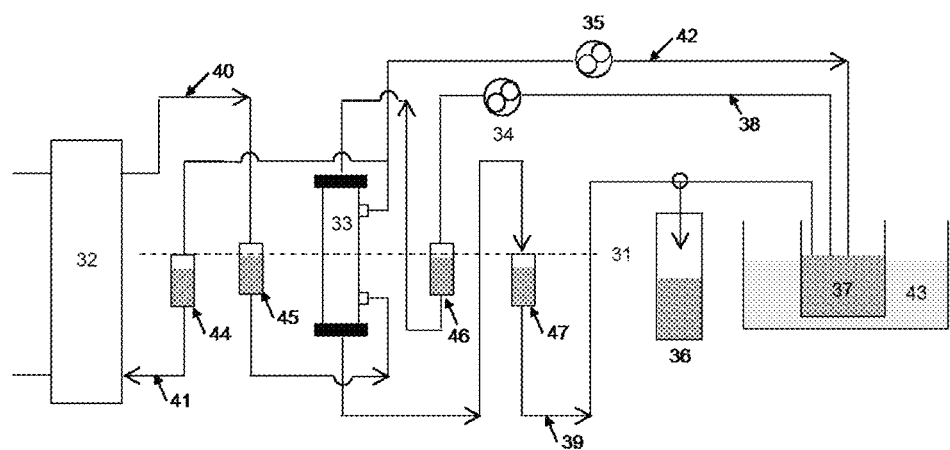
FIG. 3 is a device/circuit diagram in the measurement of time-dependent change in albumin sieving coefficient.

A schematic diagram showing a device for measuring time-dependent change in albumin sieving coefficient is illustrated in FIG. 3. TR3000S manufactured by (Toray Medical Co., Ltd.) was used as a dialyzer. In FIG. 3, TR3000S includes elements corresponding to a Bi pump 34, an F pump 35, and a dialyzer 32. Each circuit is provided with chambers (Do circuit chamber 44, Di circuit chamber 45, Bi circuit chamber 46, and Bo circuit chamber 47) for removal of bubbles in a liquid. A liquid level of the Bi circuit chamber and a liquid level of the Di circuit chamber, as well as the upper portion of the Bo circuit chamber and the upper portion of the Do circuit chamber were adjusted to the same height of the base line 31 so as not to cause pressure difference.

Bovine blood containing sodium citrate added thereto was so prepared as to have a hematocrit value of 30%, a total protein amount of 6.5 g/dL, and a temperature is 37° C., and charged in a circulation beaker 37, and then the circulation beaker 37 was set in a warm water tank 43 as shown in FIG. 3.

An inlet of process liquid of a hollow fiber membrane module 33 and a circulation beaker 37 were connected through a Bi circuit 38 via a Bi pump 34. An outlet of process liquid of the hollow fiber membrane module 33 and the circulation beaker 37 were connected through a Bo circuit 39. A dialyzate solution outlet of a dialyzer 32 and an inlet of process liquid of the hollow fiber membrane module 33 were connected through a Di circuit 40. A dialyzate solution inlet of the dialyzer 32 and an outlet of process liquid hollow fiber membrane module 33 were connected through a Do circuit 41.

Dialyzate solutions (Kindaly solution AF No. 2, manufactured by Fuso Pharmaceutical Industries, Ltd.) A and B were set in a dialyzer 32. The concentration of the dialyzate solution was set in a range 13 to 15 mS/cm and the temperature was set at 34° C. or higher, and then the dialyzate solution flow rate was set at 500 mL/min.

The inlet of the Bi circuit 38 was placed in a beaker containing a saline solution and a flow rate of the Bi pump 34 was set at 200 mL/min, and then the pump was started and the hollow fiber membrane module was washed for 5 minutes.

Next, the inlet of the Bi circuit 38 was placed in a beaker 37 containing 2 L of bovine blood (37° C.) prepared above and a flow rate of the Bi pump 34 was set at 200 mL/min, and then the pump was started. After the liquid discharged from the outlet of the Bo circuit 39 was discarded in a waste container 36 for 90 seconds, the outlet of the Bo circuit 39 and the outlet of the Do circuit 41 were immediately placed in the circulation beaker 37 to form a circulation state. Thereafter, a dehydration rate of the F pump 35 was set at 10 mL/(min·m$^2$) and the pump was started in an SCUM mode. The dialyzate solution containing a part of blood filtered through the hollow fiber membrane is discharged from the outlet of the process liquid of the hollow fiber membrane module 33. A part of the discharged dialyzate solution was returned to the circulation beaker through a filtrate circulation circuit 42 via the F pump 35 to prevent the circulating blood from being concentrated. Sampling was performed with time from the inlet side of the Bi circuit 38, the outlet side of the Bo circuit 39, and the outlet side of the Do circuit 41 outlet side. The blood sample from the Bi circuit 38 and the Bo circuit 39 was centrifuged at 3,000 rpm for 10 minutes centrifugation, and blood plasma as the supernatant was used as a sample for measurement of albumin. Using A/GB Test Wako (manufactured by Wako Pure Chemical Industries, Ltd.), the concentration of albumin was measured. The albumin sieving coefficient (Sc-Alb) every elapsed time by the following equation:

Sc-Alb (%)=2CDo/(CBi+CBo)×100

Where CDo denotes an albumin concentration (g/mL) of a Do circuit outlet side, CBi denotes an albumin concentration (g/mL) of a Bi circuit inlet side, and CBo denotes an albumin concentration (g/mL) of a Bo circuit outlet side. Using the following equation, a retention ratio of an albumin sieving coefficient after lapsed time of 240 minutes was calculated from the values of the albumin sieving coefficient after circulation for 5 minutes and circulation for 240 minutes.

Albumin sieving coefficient retention ratio (%)=Sc-Alb (after 240 minutes)/Sc-Alb (after 5 minutes)×100.

(9) Measurement of Amount of Eluted Substance by Aqueous Potassium Permanganate Solution Ultrapure water as an initial washing liquid was allowed to pass through the inner side of the hollow fiber membrane module to be measured at a rate of 100 mL/min and 25 mL of first water flowed out after filling the hollow fiber membrane module with water was sampled and 10 mL of water was collected. To the water, 20 mL of an aqueous potassium permanganate solution ($2.0 \times 10^{-3}$ mol/L), 1 mL of sulfuric acid (10% by volume), and a boiling stone were added, followed by boiling for 3 minutes. The mixture was cooled to room temperature. After adding 1 mL of an aqueous 10% by mass potassium iodide solution, the mixture was well stirred at room temperature and left to stand for 10 minutes, followed by titration with an aqueous sodium thiosulfate solution ($1.0 \times 10^{-2}$ mol/L). At the time when color of the solution turns pale yellow, 0.5 mL of an aqueous 1% by mass starch solution was added, followed by well stirring at room temperature. Titration with an aqueous sodium thiosulfate solution was continued until color of the solution turns transparent. Ultrapure water, which was not allowed to pass through the hollow fiber membrane module, was also subjected to titration in the same manner as in the measurement sample A difference between the amount of the aqueous sodium thiosulfate solution ($1.0 \times 10^{-2}$ mol/L) required for titration of ultrapure water, which was not allowed to pass through the hollow fiber membrane module, and the amount of the aqueous sodium thiosulfate solution ($1.0 \times 10^{-2}$ mol/L) required for titration of the initial washing liquid was determined to be an index of the amount of the eluted substance. An average of the results obtained by measuring twice is determined to be a measured value and a value, which is obtained by rounding off the third decimal position of the results, was used.

(10) Measurement of Relative Humidity

A hygrothermograph (indicator HM141, probe HMP42, manufactured by VAISALA KK) was inserted into a hermetically sealed hollow fiber membrane module, and the measurement was carried out.

(11) Evaluation of Defoamability

In a state where the inlet of the liquid to be treated of the hollow fiber membrane module faces the lower side and the outlet of the liquid to be treated faces the upper side, ultrapure water was allowed to pass through the hollow fiber membrane module at a flow rate of 100 mL/min for 5 minutes. At this time, an attention was paid so as not to vibrate the hollow fiber membrane module. Thereafter, ultrapure water was allowed to pass while hitting the hollow fiber membrane module for 2 minutes. In that case, bubbles generated from the inside of the hollow fiber were collected in a glass bottle by the water displacement method, followed by closing with a cover in water. Thereafter, water droplets around the glass bottle were removed by compressed air, and the weight (x) of the glass bottle was measured. Separately, the weight (y) was measured in a state where the glass bottle is filled with water. An average of the weight of the glass bottle, obtained by measuring three times during water filling, was used. The amount of bubbles generated from the inside of the hollow fiber was determined from a difference between the weight (y) of the glass bottle during water filling and the weight (x) of the glass bottle after collecting bubbles. Specific gravity of water was 1.0. A value, which is obtained by rounding off the third decimal position of the resulting calculated value, was used. Foamability was rated "Good" when the amount of bubbles is less than 0.15 mL, while foamability was rated "Poor" when the amount of bubbles is 0.15 mL or more.

Amount of bubbles generated (mL)=$y$ (g)–$x$ (g).

Example 1

16% by mass of polysulfone ("Udel (registered trademark)" P-3500, manufactured by Solvay S.A.), 4% by mass of polyvinylpyrrolidone (K30, manufactured by International Specialty Products, Inc. (hereinafter abbreviated to ISP), 2% by mass of polyvinylpyrrolidone (K90, manufactured by ISP), 77% by mass of N, N-dimethylacetamide, and 1% by mass of water were dissolved with heating to obtain a membrane forming stock solution. A solution of 63% by mass of N,N-dimethylacetamide and 37% by mass of water was used as an injection liquid.

The membrane forming stock solution and the injection liquid were fed to a spinning spinneret at a temperature of 50° C., and discharged through an outside tube of an orifice-type double annulation spinneret with a circular slit part having an outer diameter of 0.35 mm and an inner diameter of 0.25 mm, while the injection liquid was discharged through an inside tube. The discharged membrane forming stock solution was allowed to pass through a 350 mm dry-zone atmosphere at a temperature of 30° C. and a dew point of 28° C. and to pass through a coagulation bath of 100% by mass of water at a temperature of 40° C. The hollow fiber membrane was allowed to pass through a water washing step at 60 to 75° C. for 90 seconds, a drying step at 130° C. for 2 minutes, and a crimping step at 160° C. to obtain a hollow fiber membrane. The hollow fiber membrane thus obtained was wound into a hollow fiber membrane bundle. The hollow fiber membrane had an inner diameter of 200 μm and an outer diameter of 280 μm.

The hollow fiber membrane 13 was filled into a case 11 so as to have an effective inner surface area (surface area of the part which is not coated with a potting material to be added in the subsequent step in a surface of the hollow fiber membrane inner surface) of 1.5 m², and both ends of the hollow fiber membrane were fixed onto the ends of the case with a potting material 17. The ends of the potting material were partially cut such that openings were formed at both ends of the hollow fiber membrane, and headers 14A and 14B were attached to both sides of the case to obtain a hollow fiber membrane module.

Next, as a washing step, an aqueous solution of 0.01% by mass partially saponified polyvinyl alcohol (PVA417, manufactured by KURARAY CO., LTD.) at 25° C. was allowed to pass from the inlet 15A of the liquid to be treated (hollow fiber membrane inner surface side inlet) of the hollow fiber membrane module to the outlet 15B of the liquid to be treated (hollow fiber membrane inner surface side outlet) at a rate of 500 mL/min for 1 minute. Furthermore, the solution was allowed to pass from the inlet 15A of the liquid to be treated to a nozzle (process liquid inlet) 16A in a membrane thickness direction at a rate of 500 mL/min for 1 minute. Then, the filling liquid was pressed from the nozzle 16A to the inlet 15A of the liquid to be treated with compressed air at 100 kPa, and the filling liquid of the inner surface side of the hollow fiber membrane was blown with compressed air in a direction of from 15B to 15A so that a state where only the hollow fiber membrane is wetted was achieved. Furthermore, while simultaneously blowing the inner surface side and the outer surface side of the hollow fiber membrane with compressed air at a flow rate of 30 L/min, the hollow fiber membrane was dried by irradiation with a microwave (2.5 kw). Here, the water content of the hollow fiber membrane module was determined in the same manner as mentioned above.

The air in the hollow fiber membrane module was replaced by nitrogen, followed by capping with an oxygen-impermeable rubber stopper and further irradiation with γ radiation in a radiation dose of 25 kGy to obtain a hollow fiber membrane module 1. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. The hollow fiber membrane module thus obtained is that in which, although no insoluble component was observed, little eluted substance is eluted and the flexible layer has sufficient thickness, and fewer platelets are adhered.

Example 2

The same test as in Example 1 was performed, except that an aqueous solution of a 0.01% by mass vinylpyrrolidone/vinyl acetate (5/5 (molar ratio, the same shall apply hereinafter) random copolymer ("KOLLIDON" (registered trademark) VA55, manufactured by BASF Corporation) at 25° C. was used as the washing liquid to be used in the washing step, a hollow fiber membrane module 2 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. The hollow fiber membrane module thus obtained is that in which, although no insoluble component was observed, like Example 1, the flexible layer has sufficient thickness and fewer platelets are adhered. Although the desorption equilibrium constant of a polymer (vinylpyrrolidone/vinyl acetate (5/5) random copolymer) contained in the washing liquid relative to polysulfone is slightly lower than that of the polymer used in Example 1, low elution amount could be achieved.

Example 3

The same test as in Example 2 was performed, except that the temperature of the washing liquid was set at 50° C., a hollow fiber membrane module 3 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. Increase in temperature of the washing liquid leads to increased amount of the polymer localized in the surface and increased washing efficiency, thus enabling achievement of lower elution than that of Example 2.

Example 4

The same test as in Example 1 was performed, except that an aqueous solution of a 0.01% by mass vinylpyrrolidone/vinyl acetate (6/4) random copolymer ("KOLLIDON" (registered trademark) VA64, manufactured by BASF Corporation) at 25° C. was used as the washing liquid to be used in the washing step, a hollow fiber membrane module 4 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. The hollow fiber membrane module thus obtained is that in which, although no insoluble component was observed, like Example 1, the flexible layer has sufficient thickness and fewer platelets are adhered. Although the desorption equilibrium constant of a polymer (vinylpyrrolidone/vinyl acetate (6/4) random copolymer) contained in the washing liquid relative to polysulfone is slightly lower than that of the polymers used in Examples 1 and 2, low elution amount could be achieved.

Example 5

The same test as in Example 1 was performed, except that an aqueous solution of a 0.03% by mass vinylpyrrolidone/vinyl acetate (7/3) random copolymer (manufactured by BASF Corporation "KOLLIDON" (registered trademark) VA73) at 50° C. was used as the washing liquid to be used in the washing step, a hollow fiber membrane module 5 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. Although the desorption equilibrium constant of a polymer (vinylpyrrolidone/vinyl acetate (7/3) random copolymer) contained in the washing liquid relative to polysulfone is slightly lower than that of the polymers used in Examples 1 and 2, low elution amount can be achieved and also fewer platelets are adhered.

Example 6

The same test as in Example 1 was performed, except that an aqueous solution of a 0.01% by mass vinylpyrrolidone/vinylcaprolactam (5/5) copolymer (VPC55) at 25° C. was used as the washing liquid to be used in the washing step, a hollow fiber membrane module 6 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. The hollow fiber membrane module thus obtained is that in which, although no insoluble component was observed, like Example 1, the flexible layer has sufficient thickness. Although the desorption equilibrium constant of a polymer (vinylpyrrolidone/vinylcaprolactam (5/5) random copolymer) contained in the washing liquid relative to polysulfone is slightly lower than that of the polymer used in Example 1, low elution amount could be achieved. Because of having no ester group, the number of the adhered platelets was slightly large.

Example 7

The same test as in Example 1 was performed, except that an aqueous solution of a 0.01% by mass vinylpyrrolidone/vinyl acetate (6/4) random copolymer ("KOLLIDON" (registered trademark) VA64, manufactured by BASF Corporation) at 70° C. was used as the washing liquid to be used in the washing step, and the oxygen concentration in the hollow fiber membrane module during irradiation with γ radiation was set at 1.0%, a hollow fiber membrane module 7 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. As compared with Example 4, a large amount of ester groups existed in the surface of the functional layer of the hollow fiber membrane. The reason is considered that increase in washing liquid temperature leads to enhanced hydrophobic interaction between a polymer and polysulfone in the washing liquid. Furthermore, low elution could be achieved even under the condition of slightly high oxygen concentration.

Example 8

The same test as in Example 1 was performed, except that an aqueous solution of a 0.02% by mass vinylpyrrolidone/vinyl acetate (6/4) random copolymer ("KOLLIDON" (registered trademark) VA64, manufactured by BASF Corporation) at 25° C. was used as the washing liquid to be used in the washing step, a hollow fiber membrane module 8 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. As compared with Example 4, a large amount of ester groups existed in the surface of the functional layer of the hollow fiber membrane. The reason is considered that increase in amount of the polymer to be added to the washing liquid leads to increased washing property and increase in amount of the polymer adsorbed onto the surface.

Example 9

The same test as in Example 1 was performed, except that an aqueous solution of a 0.01% by mass vinylpyrrolidone/vinyl acetate (6/4) random copolymer ("KOLLIDON" (registered trademark) VA64, manufactured by BASF Corporation) at 60° C. was used as the washing liquid to be used in the washing step, a hollow fiber membrane module 9 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. As compared with Example 4, a large amount of ester groups existed in the surface of the functional layer of the hollow fiber membrane. The reason is considered that increase in washing liquid temperature leads to enhanced hydrophobic interaction between a polymer and polysulfone in the washing liquid. Furthermore, little eluted substance was eluted.

Example 10

Fifteen percentage (15%) by mass of polysulfone ("Udel (registered trademark)" P-3500, manufactured by Solvay S.A.), 1% by mass of polyvinylpyrrolidone (K30, ISP), 3% by mass of polyvinylpyrrolidone (K90, manufactured by ISP), 80% by mass of N,N-dimethylacetamide, and 1% by mass of water were dissolved with heating to obtain a membrane forming stock solution. The same test as in Example 1 was performed, except that a solution of 63% by mass of N,N-dimethylacetamide, 36.97% by mass of water, and 0.03% by mass of a vinylpyrrolidone/vinyl acetate (6/4) random copolymer ("KOLLIDON" (registered trademark) VA64, manufactured by BASF Corporation) was used as an injection liquid, and the solution used for washing was changed to water at 50° C., a hollow fiber membrane module 10 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. Even when a polymer including a hydrophilic unit and a hydrophobic unit was added to the injection liquid, a hollow fiber membrane module with little insoluble component and eluted substance was obtained.

Comparative Example 1

The same test as in Example 1 was performed, except that water at 25° C. was used as the washing liquid to be used in the washing step, a hollow fiber membrane module 11 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. As compared with Example 1, the hydrophilic polymer was eluted in a large amount. The reason is considered that low washing effect was exerted when using water alone. Furthermore, the flexible layer had a small thickness and a lot of platelets were adhered.

Comparative Example 2

The same test as in Example 1 was performed, except that water at 70° C. was used as the washing liquid to be used in the washing step, a hollow fiber membrane module 12 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. Increase of the washing liquid temperature leads to decrease in elution amount of the hydrophilic polymer as compared with Comparative Example 1.

Comparative Example 3

The same test as in Example 1 was performed, except that an aqueous solution of 0.01% by mass vinylpyrrolidone K90 (manufactured by IPS) at 25° C. was used as the washing liquid to be used in the washing step, was used as the washing liquid to be used in the washing step, a hollow fiber membrane module 13 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. As compared with Comparative Examples 1 and 2, the amount of an eluted substance and number of the adhered platelets decreased, but sufficient effect was not exerted. The reason is considered that the adsorption equilibrium constant of vinylpyrrolidone to polysulfone was low, leading to insufficient washing.

Comparative Example 4

The same test as in Example 1 was performed, except that an aqueous solution of a 0.001% by mass vinylpyrrolidone/vinyl acetate (6/4) random copolymer ("KOLLIDON" (registered trademark) VA64, manufactured by BASF Corporation) at 25° C. was used as the washing liquid to be used in the washing step, a hollow fiber membrane module 14 was obtained. The amount of an insoluble component of the resulting hollow fiber membrane module, the amount of an eluted substance, and the microscopic ATR and the number of the adhered platelets of the inner surface of the hollow fiber membrane were measured. The results are shown in Table 2. Although the flexible layer had a large thickness and fewer platelets were adhered, sufficient washing effect was not exerted and a large amount of an eluted substance was eluted.

Comparative Example 5

The same test as in Comparative Example 4 was performed, except that the water content of the hollow fiber membrane module during irradiation with γ radiation was set at 283%, a hollow fiber membrane module 15 was obtained. The amount of an insoluble component of the resulting hollow fiber membrane module, the amount of an eluted substance, and the microscopic ATR and the number of the adhered platelets of the inner surface of the hollow fiber membrane were measured. Because of high water content during irradiation with γ radiation, the crosslinking reaction proceeded, leading to high content of an insoluble component. The reason may be considered that deterioration of mobility of the polymer of the surface of the membrane leads to low retention ratio of the albumin sieving coefficient. Defoamability was also inferior as compared with the polymer having low water content.

Comparative Example 6

The same test as in Example 4 was performed, except that the oxygen concentration in the hollow fiber membrane module during irradiation with γ radiation was set at 2.5%, a hollow fiber membrane module 16 was obtained. The amount of an insoluble component of the resulting hollow fiber membrane module, the amount of an eluted substance, and the microscopic ATR and the number of the adhered platelets of the inner surface of the hollow fiber membrane were measured. Because of high oxygen concentration during irradiation with γ radiation and occurrence of decomposition of the polymer due to generation of an oxygen radical, the amount of an eluted substance increased.

TABLE 1

|  | Composition of stock solution PSf/PVP K30/K90 | Adsorption equilibrium constant of PVP K30/K90 (pg/mm² · ppm) | Washing liquid | Adsorption equilibrium constant of PSf to polymer added to washing liquid or injection liquid (pg/mm² · ppm) | Washing liquid temperature (° C.) |
|---|---|---|---|---|---|
| Example 1 | 16/4/2 | 126/317 | PVA 100 ppm | 1,300 | 25 |
| Example 2 | 16/4/2 | 126/317 | VA55 100 ppm | 845 | 25 |
| Example 3 | 16/4/2 | 126/317 | VA55 100 ppm | 845 | 50 |
| Example 4 | 16/4/2 | 126/317 | VA64 100 ppm | 701 | 25 |
| Example 5 | 16/4/2 | 126/317 | VA73 300 ppm | 558 | 50 |
| Example 6 | 16/4/2 | 126/317 | VPC55 100 ppm | 485 | 25 |
| Example 7 | 16/4/2 | 126/317 | VA64 100 ppm | 701 | 70 |
| Example 8 | 16/4/2 | 126/317 | VA64 200 ppm | 701 | 25 |
| Example 9 | 16/4/2 | 126/317 | VA64 100 ppm | 701 | 60 |
| Example 10 | 15/1/3 | 126/317 | Injection liquid: VA64 300 ppm Washing liquid: Water | 701 | 50 |
| Comparative Example 1 | 16/4/2 | 126/317 | Water | — | 25 |
| Comparative Example 2 | 16/4/2 | 126/317 | Water | — | 70 |
| Comparative Example 3 | 16/4/2 | 126/317 | PVP K90 100 ppm | 317 | 25 |
| Comparative Example 4 | 16/4/2 | 126/317 | VA64 10 ppm | 701 | 25 |
| Comparative Example 5 | 16/4/2 | 126/317 | VA64 10 ppm | 701 | 25 |
| Comparative Example 6 | 16/4/2 | 126/317 | VA64 100 ppm | 701 | 25 |

In the table, abbreviations are as follows.
PSf: Polysulfone
PVP: Polyvinylpyrrolidone
PVA: Partially saponified polyvinyl alcohol

TABLE 2

|  | Content of insoluble component (% by mass) | Elution amount of hydrophilic polymer (mg/m²) | Thickness of flexible layer (nm) | Water content (%) | Oxygen concentration during irradiation with γ radiation (%) | Carbon derived from ester group of functional layer surface (atomic %) |
|---|---|---|---|---|---|---|
| Example 1 | 0.8 | 0.7 | 8 | 2.2 | 0.02 | 2.1 |
| Example 2 | 0.4 | 0.8 | 14 | 0.9 | 0.02 | 1.6 |
| Example 3 | 0.5 | 0.5 | 19 | 1.2 | 0.02 | 2.1 |
| Example 4 | 0.5 | 0.9 | 13 | 1.5 | 0.02 | 1.1 |
| Example 5 | 0.7 | 1.0 | 18 | 1.6 | 0.02 | 1.6 |
| Example 6 | 0.8 | 0.8 | 14 | 2.5 | 0.02 | — |
| Example 7 | 0.6 | 0.7 | 21 | 2.3 | 1.00 | 2.4 |
| Example 8 | 0.6 | 0.7 | 16 | 1.2 | 0.02 | 1.4 |
| Example 9 | 0.5 | 0.5 | 19 | 1.8 | 0.02 | 1.6 |
| Example 10 | 0.6 | 1.0 | 19 | 1.9 | 0.02 | 1.6 |
| Comparative Example 1 | 0.8 | 6.0 | 4 | 2.1 | 0.02 | — |
| Comparative Example 2 | 0.8 | 4.9 | 4 | 2.3 | 0.02 | — |
| Comparative Example 3 | 0.6 | 2.0 | 6 | 1.6 | 0.02 | — |
| Comparative Example 4 | 0.5 | 2.3 | 7 | 1.1 | 0.02 | 0.8 |
| Comparative Example 5 | 5.3 | 0.3 | 14 | 283.0 | 0.02 | 1.1 |
| Comparative Example 6 | 0.5 | 1.5 | 13 | 1.1 | 2.50 | 1.1 |

TABLE 2-continued

| | Inner surface ATR $(A_{COO})/(A_{CC})$ | Number of adhered platelets (platelets/ $4.3 \times 10^3$ μm²) | Albumin sieving coefficient retention ratio (%) | Consumption amount of potassium permanganate of initial washing liquid (mL/m²) | Relative humidity at 25° C. (% Rh) | Defoamability |
|---|---|---|---|---|---|---|
| Example 1 | 0.03 | 10 | 57 | 0.75 | 15.7 | Good |
| Example 2 | 0.04 | 1 | 55 | 0.82 | 12.1 | Good |
| Example 3 | 0.07 | 2 | 60 | 0.69 | 15.2 | Good |
| Example 4 | 0.02 | 2 | 63 | 0.68 | 10.1 | Good |
| Example 5 | 0.043 | 3 | 54 | 0.88 | 13.5 | Good |
| Example 6 | — | 10 | 50 | 0.85 | 16.4 | Good |
| Example 7 | 0.01 | 1 | 68 | 0.72 | 15.8 | Good |
| Example 8 | 0.03 | 2 | 64 | 0.71 | 9.5 | Good |
| Example 9 | 0.05 | 2 | 70 | 0.62 | 14.6 | Good |
| Example 10 | 0.06 | 2 | 61 | 0.91 | 17.3 | Good |
| Comparative Example 1 | — | 50 | 29 | — | 16.6 | Good |
| Comparative Example 2 | — | 50 | 26 | — | 13.2 | Good |
| Comparative Example 3 | — | 30 | — | — | 12.9 | Good |
| Comparative Example 4 | 0.01 | 10 | 56 | — | 8.5 | Good |
| Comparative Example 5 | 0.02 | 2 | 49 | — | — | Poor |
| Comparative Example 6 | 0.02 | 3 | 55 | — | 10.2 | Good |

REFERENCE SIGNS LIST

11: Cylindrical case
13: Hollow fiber membrane
14A: Header
14B: Header
15A: Inlet of liquid to be treated (hollow fiber membrane inside inlet)
15B: Outlet of liquid to be treated (hollow fiber membrane inside outlet)
16A: Nozzle (inlet of process liquid)
16B: Nozzle (outlet of process liquid)
17: Potting material
21: Region before contact of cantilever to surface of functional layer
22: Nonlinear region curved on force curve, appeared after contact of cantilever with surface of functional layer
23: Region in which force curve has linear relationship, appeared after contact of cantilever with surface
24: Thickness of flexible layer
31: Base line
32: Dialyzer
33: Hollow fiber membrane module
34: Bi pump
35: F pump
36: Waste container
37: Circulation beaker
38: Bi circuit
39: Bo circuit
40: Di circuit
41: Do circuit
42: Filtrate circulation circuit
43: Warm water tank
44: Do circuit chamber
45: Di circuit chamber
46: Bi circuit chamber
47: Bo circuit chamber

The invention claimed is:

1. A hollow fiber membrane module comprising a case and a hollow fiber membrane built in the case,
wherein the hollow fiber membrane contains a polysulfone-based polymer and a hydrophilic polymer, and satisfies the following (A) and (B),
wherein an amount of an eluted substance, which was obtained by dividing the amount (mg) of the hydrophilic polymer in 4 L of a liquid, where the liquid was obtained by circulating ultrapure water heated at 37° C. through a passage of an inner surface side of the hollow fiber membrane for 4 hours at 200 ml/min, by the total value of an inner surface area (m²) of the hollow fiber membrane filled into the hollow fiber membrane module, is 1.0 mg/m² or less, and
wherein the hollow fiber membrane has a water content of 4% by mass or less,
(A) an insoluble component accounts for less than 3% by mass of the total mass of the hollow fiber membrane when the hollow fiber membrane is dissolved in N,N-dimethylacetamide; and
(B) a flexible layer exists on an inner surface of the hollow fiber membrane, where the hollow fiber membrane is in a wet state and wherein the flexible layer has a thickness of 7 nm or more; and
wherein a retention ratio of the albumin sieving coefficient is 60% or more, when the concentration of albumin was measured using Bovine blood containing sodium citrate having a hematocrit value of 30%, a total protein amount of 6.5 g/dl, and a temperature of 37° C., which is circulated in the hollow fiber membrane module with a flow rate of 200 ml/min, and the albumin sieving coefficient (Sc-Alb) every elapsed time by the following equation:

Sc–Alb (%)=2CDo/(CBi+CBo)×100 where CDo denotes an albumin concentration (g/ml) of a Do circuit outlet side, CBi denotes an albumin concentration (g/ml) of a Bi circuit inlet side, and CBo denotes an albumin concentration (g/ml) of a Bo circuit outlet side, and using the following equation, a retention ratio of an albumin sieving coefficient after a lapsed time of 240 minutes was calculated from the values of the albumin sieving coefficient after circulation for 5 minutes and circulation for 240 minutes:

Albumin sieving coefficient retention ratio (%)=Sc–Alb (after 240 minutes)/Sc–Alb (after 5 minutes)×100 wherein the polysulfone-based polymer is polysulfone and the hydrophilic polymer is polyvinylpyrrolidone;

wherein the flexible layer is made of one of polyvinyl alcohol having a saponification degree of less than 99%, a vinylpyrrolidone/vinyl acetate copolymer, and a vinylpyrrolidone/vinylcaprolactam copolymer.

2. The hollow fiber membrane module according to claim 1, wherein an ester group exists in a surface of a functional layer of the hollow fiber membrane.

3. The hollow fiber membrane module according to claim 2, wherein an average of a ratio $(A_{COO})/(A_{CC})$ of an infrared absorption peak intensity $(A_{COO})$ derived from an ester group C=O in the vicinity of 1,730 cm$^{-1}$ to an infrared absorption peak intensity $(A_{CC})$ derived from a benzene ring C=C in the vicinity of 1,580 cm$^{-1}$ of a polysulfone-based polymer, on the surface of the functional layer of the hollow fiber membrane is 0.02 or more and 0.5 or less.

4. The hollow fiber membrane module according to claim 2, wherein an area percentage of a carbon peak derived from an ester group in the surface of the functional layer of the hollow fiber membrane is in a range of 1 to 10 (atomic %), as measured by X-ray photoelectron spectroscopy, on the assumption that the total peak area derived from carbon in the surface of the functional layer is 100 (atomic %).

5. The hollow fiber membrane module according to claim 1, wherein the retention ratio of the albumin sieving coefficient is 63% or more.

6. The hollow fiber membrane module according to claim 1, wherein the retention ratio of the albumin sieving coefficient is 64% or more.

7. The hollow fiber membrane module according to claim 1, wherein the retention ratio of the albumin sieving coefficient is 68% or more.

8. The hollow fiber membrane module according to claim 1, wherein the retention ratio of the albumin sieving coefficient is 70% or more.

9. A method for manufacturing a hollow fiber membrane module according to claim 1, which comprises the steps of:

mixing a base material composed of a hydrophobic polymer with a hydrophilic polymer including no hydrophobic unit to produce a hollow fiber membrane;

washing the hollow fiber membrane with a washing liquid containing 0.002% by mass or more and 0.05% by mass or less of a polymer including a hydrophilic unit and a hydrophobic unit, and also having an ester group; and building the hollow fiber membrane in a case, and irradiating the hollow fiber membrane under the conditions that the concentration of oxygen in the atmosphere around the hollow fiber membrane is in a range of 0 to 1%, and the water content relative to the mass of the hollow fiber membrane is in a range of 0 to 25% by mass.

10. The manufacturing method according to claim 9, wherein the irradiation with radiation is performed in a state where all inlets of the hollow fiber membrane module are hermetically sealed, or a state where the hollow fiber membrane module is sealed in a packaging bag.

11. The manufacturing method according to claim 9, wherein an adsorption equilibrium constant of the polymer including the hydrophilic unit and the hydrophobic unit contained in the washing liquid relative to the polysulfone-based polymer is higher than an adsorption equilibrium constant of the hydrophilic polymer constituting the hollow fiber membrane relative to the polysulfone-based polymer.

* * * * *